(12) United States Patent
Turner

(10) Patent No.: US 8,493,025 B2
(45) Date of Patent: Jul. 23, 2013

(54) ELECTRIC VEHICLE CHARGING STATION ADVERTISING SYSTEMS

(75) Inventor: Dexter Turner, West Linn, OR (US)

(73) Assignee: Optimization Technologies, Inc., Beaverton, OR (US)

( * ) Notice: Subject to any disclaimer, the term of this patent is extended or adjusted under 35 U.S.C. 154(b) by 289 days.

(21) Appl. No.: 12/954,209

(22) Filed: Nov. 24, 2010

(65) Prior Publication Data

US 2011/0204847 A1    Aug. 25, 2011

Related U.S. Application Data

(60) Provisional application No. 61/307,318, filed on Feb. 23, 2010, provisional application No. 61/409,108, filed on Nov. 1, 2010, provisional application No. 61/307,377, filed on Feb. 23, 2010, provisional application No. 61/353,944, filed on Jun. 11, 2010, provisional application No. 61/317,181, filed on Mar. 24, 2010.

(51) Int. Cl.
*H02J 7/00* (2006.01)
*G07F 19/00* (2006.01)
*B60W 10/24* (2006.01)

(52) U.S. Cl.
USPC ............. 320/109; 320/104; 320/138; 705/34; 180/65.29

(58) Field of Classification Search
USPC ........................................ 320/109, 104, 138
See application file for complete search history.

(56) References Cited

U.S. PATENT DOCUMENTS

| | | | |
|---|---|---|---|
| 4,532,418 | A | 7/1985 | Meese et al. |
| 5,202,617 | A | 4/1993 | Nor |
| 5,306,999 | A | 4/1994 | Hoffman |
| 5,327,066 | A | 7/1994 | Smith |
| 5,369,352 | A | 11/1994 | Toepfer et al. |
| 6,225,776 | B1 | 5/2001 | Chai |
| 6,727,809 | B1 * | 4/2004 | Smith .................... 340/438 |
| 7,256,516 | B2 | 8/2007 | Buchanan et al. |
| 2004/0233055 | A1 | 11/2004 | Canich et al. |
| 2009/0287578 | A1 | 11/2009 | Paluszek et al. |
| 2009/0313032 | A1 | 12/2009 | Hafner et al. |
| 2010/0013434 | A1 | 1/2010 | Taylor-Haw et al. |
| 2010/0039067 | A1 | 2/2010 | Hill et al. |
| 2010/0213896 | A1 * | 8/2010 | Ishii et al. ................. 320/109 |

(Continued)

FOREIGN PATENT DOCUMENTS

| | | |
|---|---|---|
| WO | WO 2009/091745 | 7/2009 |
| WO | WO 2010/011545 | 1/2010 |
| WO | WO 2010/051477 | 5/2010 |

*Primary Examiner* — M'Baye Diao
(74) *Attorney, Agent, or Firm* — Klarquist Sparkman, LLP

(57) ABSTRACT

Disclosed herein are representative embodiments of methods, apparatus, and systems relating to electric vehicle charging stations ("EVCSs") and electric vehicle supply equipment ("EVSE") that are configured to display advertisements to a user. For example, in one embodiment, advertisements are displayed on a display device of the EVCS or EVSE as the EVCS or EVSE awaits user interaction. An indication is received of user interaction with the EVCS or EVSE. A transaction is facilitated between a user and the EVCS or EVSE by which the user indicates that one or more electric vehicle batteries of an electric vehicle are to be charged via one of one or more charging ports of the EVCS or EVSE. A charging operation is performed that provides an electric charge to the one or more electric vehicle batteries of the electric vehicle via the one of the one or more charging ports.

41 Claims, 16 Drawing Sheets

U.S. PATENT DOCUMENTS

| | | | |
|---|---|---|---|
| 2011/0140656 A1* | 6/2011 | Starr et al. | 320/109 |
| 2011/0169447 A1* | 7/2011 | Brown et al. | 320/109 |
| 2011/0213656 A1 | 9/2011 | Turner | |
| 2011/0238861 A1 | 9/2011 | Hutchinson | |
| 2011/0239116 A1 | 9/2011 | Turner et al. | |

* cited by examiner

ELECTRIC VEHICLE CHARGING STATION ADVERTISING SYSTEMS

CROSS-REFERENCE TO RELATED APPLICATIONS

This application claims the benefit of U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; and U.S. Provisional Application No. 61/317,181, filed on Mar. 24, 2010, and entitled "ELECTRIC VEHICLE CHARGING STATION PARKING METER SYSTEM", all of which are hereby incorporated herein by reference.

FIELD

This application relates to electric vehicle charging stations and associated systems.

SUMMARY

Disclosed below are representative embodiments of methods, apparatus, and systems relating to electric vehicle charging stations ("EVCSs") and electric vehicle supply equipment ("EVSE"). The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Among the embodiments disclosed herein are electric vehicle charging station advertising systems that can display a variety of types of advertising on a display apparatus of an EVCS or EVSE (e.g., advertisements for entities other than the EVCS/EVSE operator). Embodiments of the disclosed technology can be used to improve the basic process of connecting an electric vehicle to the power grid with an EVCS/EVSE for charging purposes by using an advertising system. The advertising system enables installers and/or manufacturers of EVCSs/EVSE to generate advertising revenue with an EVCS/EVSE, which can potentially lead to an increase in the number of EVCSs/EVSE that are installed and in the speed with which these EVCSs/EVSE are installed. Consequently, more charging equipment can be made available to electric vehicle owners, promoting faster deployment of the vehicles. In certain embodiments of the disclosed technology, advertising is displayed to the charging station users or passers-by via a suitable display device (e.g., a liquid-crystal display ("LCD") screen, a light emitting diode ("LED") screen, plasma screen, or other display apparatus installed in the EVCS/EVSE). In some embodiments, the display device further includes a touch screen to facilitate user interaction.

Embodiments of the disclosed technology display various types of advertising at an EVCS/EVSE including, for example, any one or more of: advertising which appears on all or a portion of the EVCS/EVSE display apparatus to pedestrians passing by the EVCS/EVSE; advertising which appears on all or a portion of the EVCS/EVSE display apparatus in response to a user interacting with the EVCS/EVSE; advertising which appears on all or a portion of the EVCS/EVSE display apparatus based upon the identity of the user interacting with the EVCS/EVSE; advertising which appears on all or a portion of the EVCS/EVSE based at least in part on a recognition by the EVCS/EVSE of the make, model, year of manufacture, installed accessories, or other characteristic of a vehicle which has been connected to the EVCS/EVSE for charging; advertising which appears on all or a portion of the EVCS/EVSE display apparatus based on the time-of-day, day of the week, a specific date, or other chronological reference; advertising which appears on all or a portion of the EVCS/EVSE display apparatus based on the outside air temperature, precipitation status, or other meteorological factors; or advertising which appears on all or a portion of the EVCS/EVSE display apparatus based on any combination, subcombination, or hybrid of the aforementioned factors.

The advertising can be displayed in a variety of forms. For example, the advertising can be displayed as any one or more of the following: a banner or box advertisement (e.g., an advertisement in a dedicated box on the screen) which is displayed in an area of the EVCS/EVSE display apparatus dedicated for the display of advertising, still images, motion pictures, video clips, audio clips, commercials of various running times, interactive computer software applications which request and accept user input, or any combination, subcombination, or hybrid of the aforementioned formats.

Embodiments of the disclosed systems and methods can be implemented using computing hardware, such as a computer processor embedded in the EVCS/EVSE. For example, embodiments of the disclosed methods can be performed using software stored on one or more non-transitory computer-readable media (e.g., one or more optical media discs, volatile memory components (such as DRAM or SRAM), or nonvolatile memory or storage components (such as hard drives)). Such software can be executed by a computer processor embedded in the EVCS/EVSE or by one or more computers coupled to the EVCS/EVSE by a network (e.g., via the Internet, a wide-area network, a local-area network, a client-server network, or other such network). Embodiments of the disclosed methods can also be performed by specialized computing hardware (e.g., one or more application specific integrated circuits ("ASICs") or programmable logic devices (such as field programmable gate arrays ("FPGAs"))) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions which when executed by a computer cause the computer to perform any of the disclosed methods) or results (either intermediate or final) created or modified by the disclosed methods can be transmitted, received, or accessed through a suitable communication means.

In certain embodiments, the advertising is controlled by software executed locally at the EVCS/EVSE. In other embodiments, the advertising is controlled remotely by software executed by a back office server configured to communicate with the EVCS/EVSE (e.g., via a wired or wireless communication network). The software controlling the advertising can control which advertising is displayed, in which order, and for how long. In certain embodiments, the viewer of the advertising is prompted to input information or to otherwise interact with the currently displayed advertising. This input can be processed and used to enhance the viewer's experience with the EVCS/EVSE by allowing the advertising to be specially tailored for the viewer.

The foregoing and other objects, features, and advantages of the invention will become more apparent from the following detailed description, which proceeds with reference to the accompanying figures.

DETAILED DESCRIPTION

I. General Considerations

Figure 1:
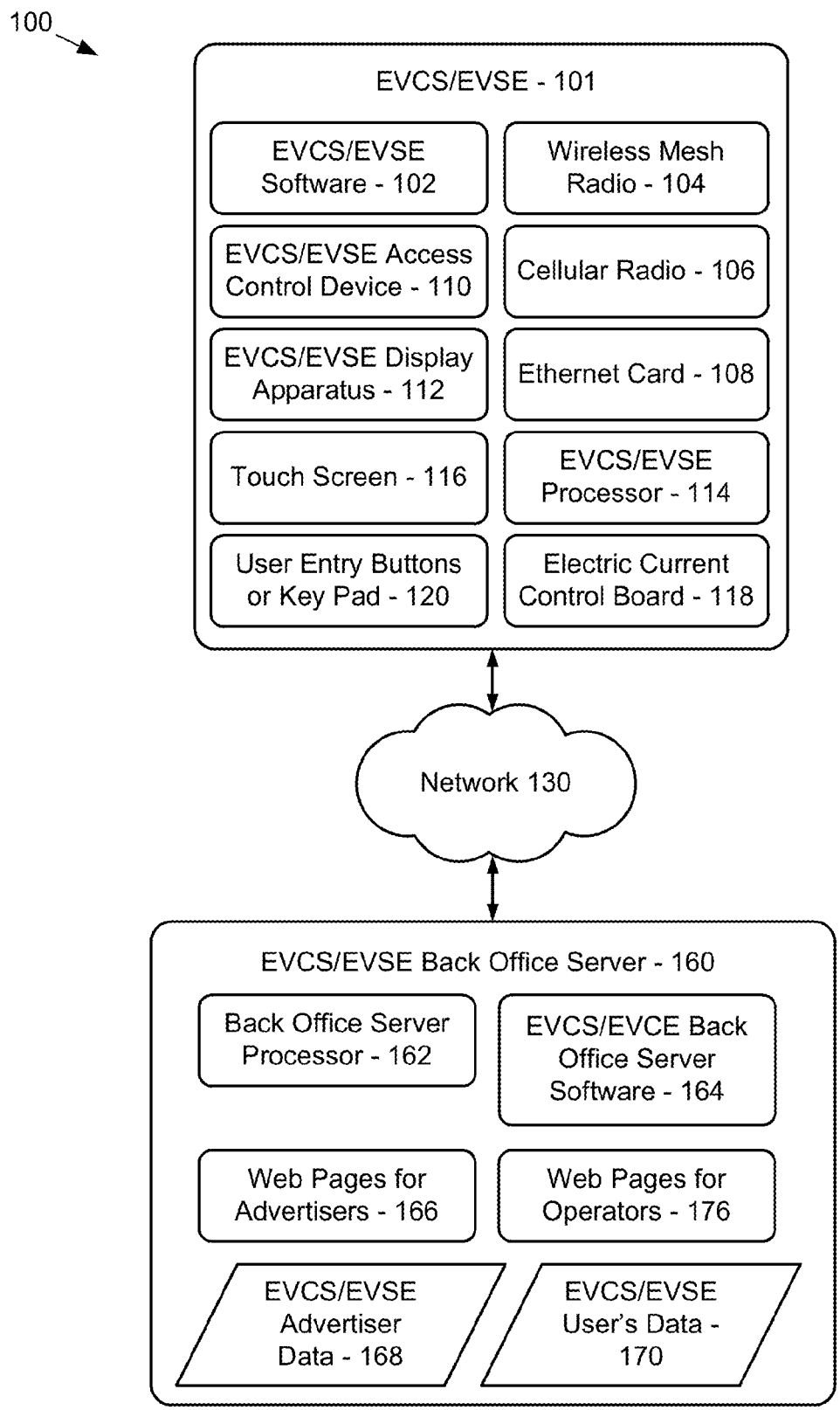
FIG. 1 is a schematic block diagram illustrating an exemplary electric vehicle charging system with a display device suitable for advertising.

Disclosed below are representative embodiments of methods, apparatus, and systems for using and operating electric vehicle charging stations ("EVCSs") or electric vehicle supply equipment ("EVSE"). The disclosed methods, apparatus, and systems should not be construed as limiting in any way. Instead, the present disclosure is directed toward all novel and nonobvious features and aspects of the various disclosed embodiments, alone and in various combinations and sub-combinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "monitor" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer processor embedded in the EVCS/EVSE). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, C#, Objective C, Java, Perl, JavaScript, Adobe Flash, or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions stored on a non-transitory computer-readable medium) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented using specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) specially designed to implement any of the disclosed methods. The integrated circuit or specialized computing hardware can be embedded in or directly coupled to an EVCS/EVSE or device that is configured to interact with the EVCS/EVSE.

Figure 19:
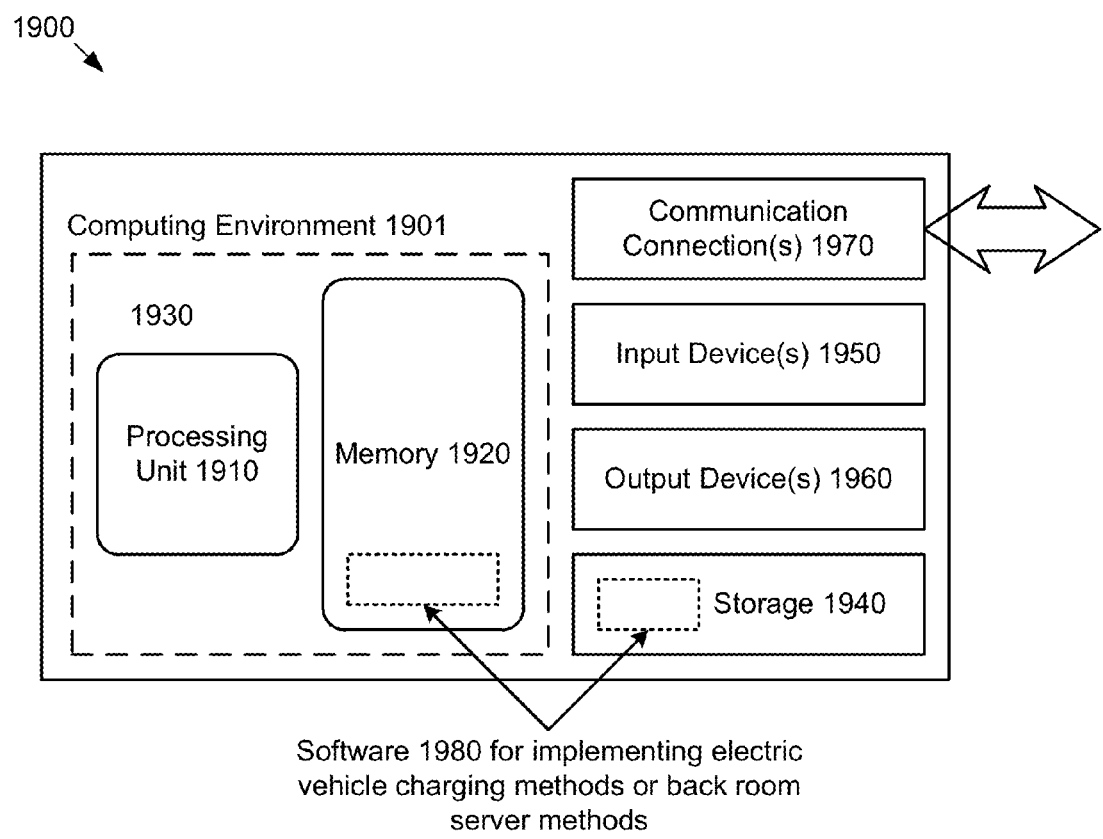
FIG. 19 is a schematic block diagram of an exemplary computing environment for implementing embodiments of the disclosed technology.

FIG. 19 is a schematic block diagram 1900 that illustrates a generalized example of a suitable computing hardware environment 1901 in which embodiments of the disclosed technology can be implemented. The computing hardware environment 1901 is not intended to suggest any limitation as to the scope of use or functionality of the disclosed technology, as the technology can be implemented in diverse general-purpose or special-purpose computing environments.

With reference to FIG. 19, the computing hardware environment 1901 includes at least one processing unit 1910 and memory 1920. In FIG. 19, this most basic configuration 1930 is included within a dashed line. The processing unit 1910 executes computer-executable instructions and may be a real or a virtual processor. In a multi-processing system, multiple processing units execute computer-executable instructions to increase processing power. The memory 1920 may be volatile memory (e.g., registers, cache, RAM, DRAM, SRAM), non-volatile memory (e.g., ROM, EEPROM, flash memory), or some combination of the two. The memory 1920 can store software 1980 for implementing one or more of the described techniques for operating or using the disclosed electric vehicle charging systems. For example, the memory 1920 can store software 1980 for implementing any of the disclosed methods and their accompanying user interfaces.

The computing hardware environment can have additional features. For example, the computing hardware environment 1901 includes storage 1940, one or more input devices 1950, one or more output devices 1960, and one or more communication connections 1970. An interconnection mechanism (not shown) such as a bus, controller, or network interconnects the components of the computing hardware environment 1901. Typically, operating system software (not shown) provides an operating environment for other software executing in the computing hardware environment 1901, and coordinates activities of the components of the computing hardware environment 1901.

Storage 1940 is a type non-volatile memory and can be removable or non-removable. The storage 1940 includes, for instance, magnetic disks (e.g., hard drives), magnetic tapes or cassettes, optical storage media (e.g., CD-ROMs or DVDs), or any other tangible non-transitory storage medium which can be used to store information and which can be accessed within or by the computing hardware environment 1901. The storage 1940 can store the software 1980 for implementing any of the described techniques, systems, or environments.

The input device(s) 1950 can be a touch input device such as a keyboard, mouse, touch screen, pen, trackball, a voice input device, a scanning device, or another device that provides input to the computing environment 1901. The output device(s) 1960 can be a display, touch screen, printer, speaker, or another device that provides output from the computing environment 1901.

The communication connection(s) 1970 enable communication over a communication medium to another computing entity. The communication medium conveys information such as computer-executable instructions, any of the intermediate or final messages or data used in implementing embodiments of the disclosed technology, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. For example, the communication connection(s) 1970 can communicate with another computing entity over a wired or wireless network (e.g., the Internet, a wide-area network, a local-area network, a WiFi network, a client-server network, a wireless mesh network, or other such network or any combination thereof).

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing hardware environment 1901, computer-readable media include tangible non-transitory computer-readable media such as memory 1920 and storage 1940. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Exemplary Embodiments of the Disclosed Technology

FIG. 1 is a schematic block diagram 100 illustrating an EVCS/EVSE computing hardware environment 101 for implementing embodiments of the disclosed technology. In particular, FIG. 1 illustrates an exemplary computing hardware environment 101 for an EVCS/EVSE and an exemplary computing hardware environment 160 for an EVCS/EVSE back office server. The EVCS/EVSE environment 101 is more specialized than computing hardware environment 1901 but should not be construed as limiting the types of hardware that can be used to implement the disclosed technology. Furthermore, the EVCS/EVSE environment 101 and the exemplary computing hardware environment 160 for the EVCS/EVSE back office server can include any of the components described above with respect to the general computing hardware environment 1901.

The EVCS/EVSE computing hardware environment 101 includes software 102, which comprises computer-executable instructions stored on non-transitory computer-readable media (e.g., any one or more of the non-transitory computer-readable media described above). When executed, the software can be used to implement the functionality of the EVCS/EVSE, which is described in more detail below. The EVCS/EVSE computing hardware environment 101 further comprises an EVCS/EVSE processor 114 for executing the software 102. Suitable processors and associated parts can be obtained, for example, from Parvus Corporation. In the illustrated embodiment, the EVCS/EVSE processor 114 is interconnected to an electric current control board 118. The electric current control board 118, in turn, is connected to the cables and electrical connectors of the EVCS/EVSE that provide the electrical coupling to the one or more electric vehicles (e.g., via a SAE 1772 electrical connector, IEC 62196 electrical connector, or other such electric vehicle connector). Suitable electric current control boards and associated parts can be obtained, for example, from Texas Instruments, Riley Corp, and National Control Devices. In certain exemplary embodiments, the EVCS/EVSE software 102 is used to implement a process in which commands and data are exchanged to control the flow of electrical current between one or more electric vehicles plugged into the EVCS/EVSE (e.g., the EVCS/EVSE 240 shown in FIG. 2) and the power grid (e.g., the power grid 270 shown in FIG. 2). The EVCS/EVSE computing hardware environment 101 can also include a wireless mesh radio 104, a cellular radio 106 and/or an Ethernet card 108 (or other network adapter) to provide the environment 101 with a number of wired and wireless interface capabilities for exchanging data with, for example, an EVCS/EVSE back office server 160. Suitable wireless mesh radios and associated parts can be obtained, for example, from Digi International. Suitable cellular radios and associated parts can be obtained, for example, from Telit. In the illustrated embodiment, the EVCS/EVSE processor 114 includes Ethernet functionality but can include other network functionality. The EVCS/EVSE computing hardware environment 101 also includes an access control device 110, such as a magnetic card reader or radio frequency identity ("RFID") reader, and a display apparatus 112, such as an LCD, LED, or plasma screen with a touch screen interface 116. Another possible option to facilitate user interaction is using a display apparatus without a touch screen interface but with a set of user entry buttons or a keypad 120. Although the exemplary EVCS/EVSE computing hardware environment 101 is shown as including both a touch screen 116 and a set of user entry buttons or keypad 120, the touch screen 116 can be implemented or the set of user entry button or keypad 120 can be implemented alone. Suitable magnetic card readers and associated parts can be obtained, for example, from ID Tech. Suitable display apparatus and touch screen interfaces can be obtained, for example, from Logic Supply. As more fully described below, the touch screen interface 116 can be used to facilitate the charging of the electric vehicle and the proper billing (or crediting) for the electricity used (or supplied) by the electric vehicle coupled to the EVCS/EVSE. As shown in FIG. 1, the EVCS/EVSE computing hardware environment 101 is coupled to the EVCS/EVSE back office server environment 160 via a network 130 (e.g., the Internet, a wide-area network, a local-area network, a WiFi network, a client-server network, a wireless mesh network, or other such network or any combination thereof). In particular embodiments, the back office server environment 160 is implemented as part of a cloud-based back office server.

Figure 18:
FIG. 18 is an image of an exemplary EVCS/EVSE having a display device suitable for advertising in accordance with embodiments of the disclosed technology.

FIG. 18 is an image of an EVCS/EVSE 1800 in which the EVCS/EVSE environment 101 is implemented. As shown in FIG. 18, the display apparatus is desirably located in a position that allows for easy viewing by a user.

The back office server environment 160 can be implemented using a wide variety of commercially available computers and/or servers. In FIG. 1, the back office server environment 160 includes back office server software 164, which can comprise computer-executable instructions stored on non-transitory computer-readable media (e.g., any one or more of the non-transitory computer-readable media described above). When executed, the software can be used to implement the functionality of the back office server, which is described in more detail below. The EVCS/EVSE back office server 160 further comprises a back office server processor 162 for executing software 164. Also shown in FIG. 1 is EVCS/EVSE user data 170. The EVCS/EVSE user data 170 can comprise data stored on non-transitory computer-readable media that is related to users of the EVCS/EVSE. For example, the data can include data about a user's identification, address, account, usage history, vehicle, and/or other such user data. In the illustrated embodiment, the EVCS/EVSE back office server 160 further includes EVCS/EVSE advertisers' data 168.

The illustrated EVCS/EVSE back office server 160 includes web page data 166. The web page data 166 can comprise data stored on non-transitory computer-readable media that is used to render or otherwise implement one or more web pages for display to an EVCS/EVSE advertiser (e.g., advertiser 201 shown in FIG. 2) via a web site (e.g., web site 210 shown in FIG. 2). The web page data 166 can include other data used to implement the web site. The advertiser's web site can allow an advertiser to create, upload, view, and/or modify the advertiser's data 168. The advertiser's web site and its associated web pages can be displayed, for example, using a suitable Internet browser or media player implemented at a computer operated by the EVCS/EVSE advertiser and coupled to the back office server 120 via a network (e.g., the Internet, a wide-area network, a local-area network, a client-server network, a wireless mesh network, or other such network or any combination thereof). The web page data 166 can be in any format or language suitable for implementing web pages (e.g., HTML, Flash, Java, and the like). In other embodiments, the data to be displayed to the EVCS/EVSE advertiser is not stored as web page data, but as data usable via a non-web-based user interface.

Furthermore, in the illustrated embodiment, the EVCS/EVSE back office server 160 also includes data 176 for implementing one or more web pages for an EVCS/EVSE operator. The web page data 176 can comprise data stored on non-transitory computer-readable media that is used to render or otherwise implement one or more web pages for display to an EVCS/EVSE operator. The web pages can be displayed, for example, using a suitable internet browser or media player implemented at a computer operated by the EVCS/EVSE operator and coupled to the back office server 160 via a network (e.g., the Internet, a wide-area network, a local-area network, a WiFi network, a client-server network, a wireless mesh network, or other such network or any combination thereof). The web page data can be in any format or language suitable for implementing web pages (e.g., HTML, Flash, Java, and the like). In other embodiments, the data to be displayed to the EVCS/EVSE operator is not stored as web page data, but as data usable via a non-web-based user interface. In still other embodiments, no web pages for advertisers 166 is provided. Instead, the advertiser's data is provided directly to or developed by the EVCS/EVSE system operator, who then controls the display of the advertiser's data.

Figure 2:
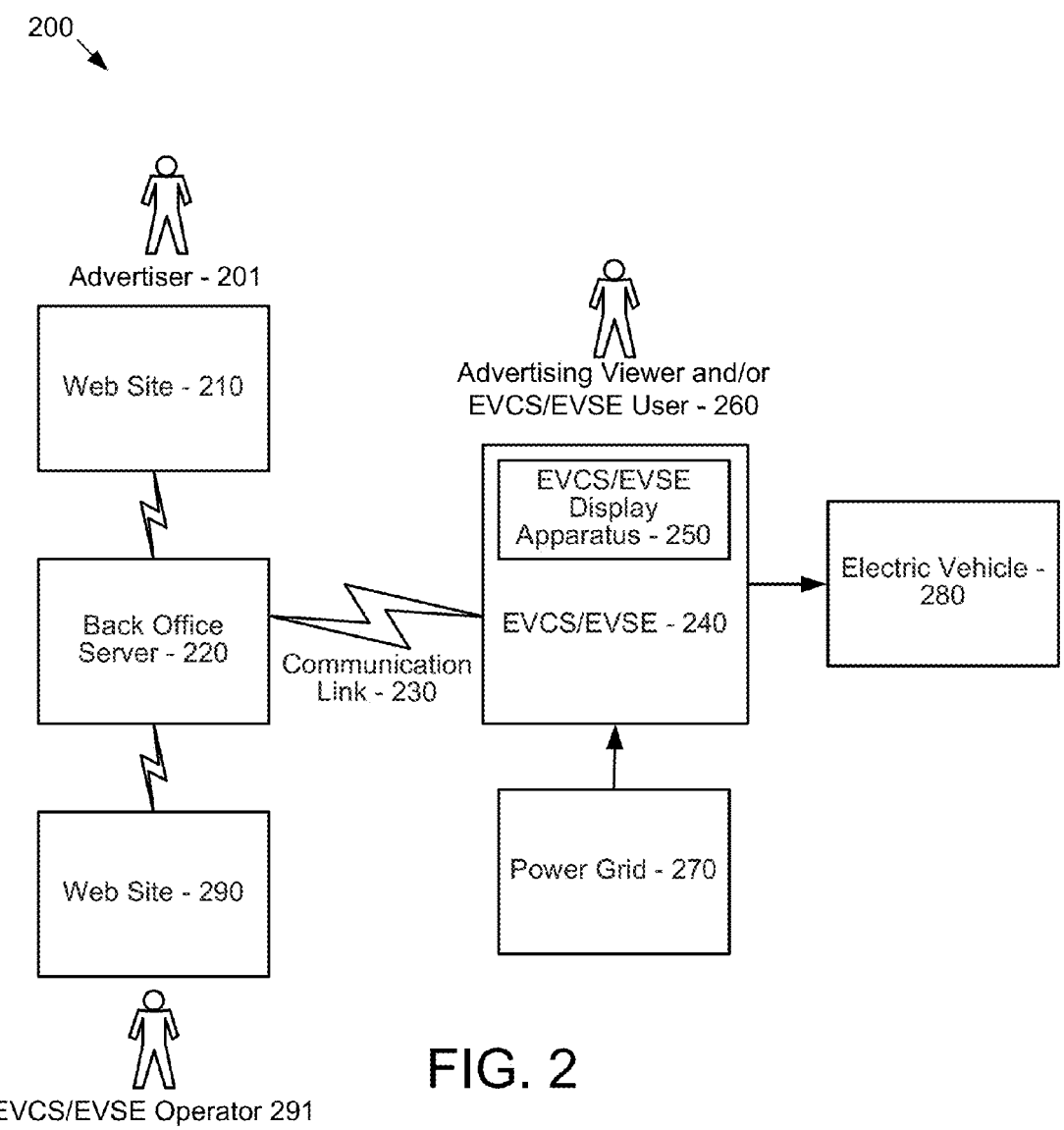
FIG. 2 is a schematic block diagram illustrating an exemplary EVCS/EVSE system and the users of the exemplary system.

FIG. 2 is a schematic block diagram 200 illustrating an exemplary EVCS/EVSE system and the users of the exemplary system. In FIG. 2, the back office server 220 communicates to one or more EVCSs/EVSEs 240 via a communication link 230 (which may be wired or wireless) to transfer advertiser's data (e.g., advertiser's data 168) to the EVCSs/EVSEs. For example, the EVCS/EVSE 240 can use a communication device (e.g., one or more of the wireless mesh radio 104, cellular radio 106, or Ethernet card 108 shown in FIG. 1) to establish the communication link 230 with the back office server 220. As noted above, the functionality of the EVCS/EVSE can be implemented by executing appropriate EVCS/EVSE software stored at the EVCS/EVSE (e.g., EVCS/EVSE software 102). The functionality of the back office server 220 can be implemented by executing appropriate back office software stored at the back office server 220 (e.g., back office server software 164). The advertiser's data that is transmitted can comprise, for example, advertising copy, images, motion pictures, audio, etc. to be displayed to one or more advertising viewers 260 via an EVCS/EVSE display apparatus 250. The advertiser's data can further comprise scheduling information, viewer criteria, and other data to determine when and to which advertising viewers 260 to display the advertising copy, images, motion pictures, audio, etc. For example, the advertising data for an advertisement can include demographic information about the intended viewer or audience for the advertisement. Such demographic information can include, for instance, an age range of the targeted viewer, a gender of the targeted viewer, a household income range of the targeted viewer, interests or personal preferences of the targeted viewer; or a home location of the targeted viewer (e.g., a neighborhood or geographic region for the targeted user). Once the advertising data is received by the EVCS/EVSE 240, it can be stored in a computer-readable medium at the EVCS/EVSE (e.g., any of the tangible non-transitory computer-readable media discussed above, such as non-volatile memory) and displayed to advertising viewer 260 on the EVCS/EVSE display apparatus 250. The display of the advertising can be controlled by the scheduling information, viewer criteria, or other data defining when and to which advertising viewers 260 to display the advertising copy, images, motion pictures, audio, etc. In certain embodiments, advertising viewers 260 can interact with the EVCS/EVSE 240 using the EVCS/EVSE display apparatus 250 (e.g., to make selections and/or enter information). For example, the display apparatus 250 can be equipped with a touch screen interface (e.g., touch screen 116). If the EVCS/EVSE 240 does not have a touch screen equipped display, advertising viewers 260 can interact with the EVCS/EVSE 240 using buttons or a keypad (user entry buttons or key pad 120) to make selections and enter information. Data associated with the advertising viewers' 260 interactions with the EVCS/EVSE can also be transmitted back to the back office server 220 via the communication link 230.

Also shown in FIG. 2 is an advertiser 201, who can access, create, upload, and/or modify any one or more aspects of the advertiser's data via a web site 210. In certain embodiments, an EVCS/EVSE operator can also access, create, upload, and/or modify any of the advertiser's data via a web site 290. For example, the advertiser 201 can have limited control over the advertiser's data (e.g., the advertiser cannot modify the schedule) whereas the EVCS/EVSE operator can control all aspects of the advertiser's data, and can thus control the schedule of the advertising (e.g., in accordance with an agreement between the EVSE/EVSE operator and the advertiser).

FIG. 2 further illustrates how interactions between the EVCS/EVSE 240 and a user and related to vehicle charging can be controlled in the exemplary EVCS/EVSE system. In FIG. 2, a user 260 can interface with an EVCS/EVSE 240 using a display apparatus 250 equipped with a touch screen. The display apparatus 250 equipped with a touch screen allows the user to view operating instructions and/or to make entries of information. The EVCS/EVSE 240 can also transmit information entered by the user 260 to the back office server 220. This information can comprise, for example, data read from the user's identification device (e.g., a card, key, or other device for authenticating the user at the EVCS/EVSE 240) or entries made by the user via the display apparatus equipped with a touch screen 250. The data from the user's identification device can be read using an access control device (e.g., access control device 110). Once user identification information is received by the back office server 220, the ability of the user to access the EVCS/EVSE can be determined (e.g., using the stored user's data 170). If the user is an authorized user, the back office server 220 transmits authorization information back to the EVCS/EVSE 240 via the communication link 230. The EVCS/EVSE 240 can then display appropriate further instructions to the user 260 using the display apparatus 250 equipped with touch screen interface. The user 260 can also use the display apparatus 250 equipped with a touch screen to request and view operating instructions or, in the event of a malfunction, request and view troubleshooting instructions. The back office server 220 is also configured to operate a web site 290 for exchanging information relating to the EVCS/EVSE with an EVCS/EVSE operator 291. The information can comprise, for example, the current status of EVCS/EVSE 240, maintenance records of the EVCS/EVSE 240, and other such information.

In particular embodiments and in the event of a malfunction, the EVCS/EVSE user 260 can use the display apparatus equipped with a touch screen 250 to request a live information exchange session with the EVCS/EVSE operator 200. The live information exchange session can comprise, for example, a textual chat, videoconference, or teleconference with the EVCS/EVSE operator 291. For instance, upon receipt of this request from the EVCS/EVSE 240 via the communication link 230, the back office server 220 will notify the EVCS/EVSE operator 291 of the request using a web site and web pages 290. The operator 291 can respond to the request and conduct the live information exchange using the web site 290 (e.g., using a suitable text, video, or teleconferencing application). Data exchanged between the user 260 and the operator 291 can be exchanged, for example, between the back office server 220 and the EVCS/EVSE 100 using the communication link 230.

Figure 3:
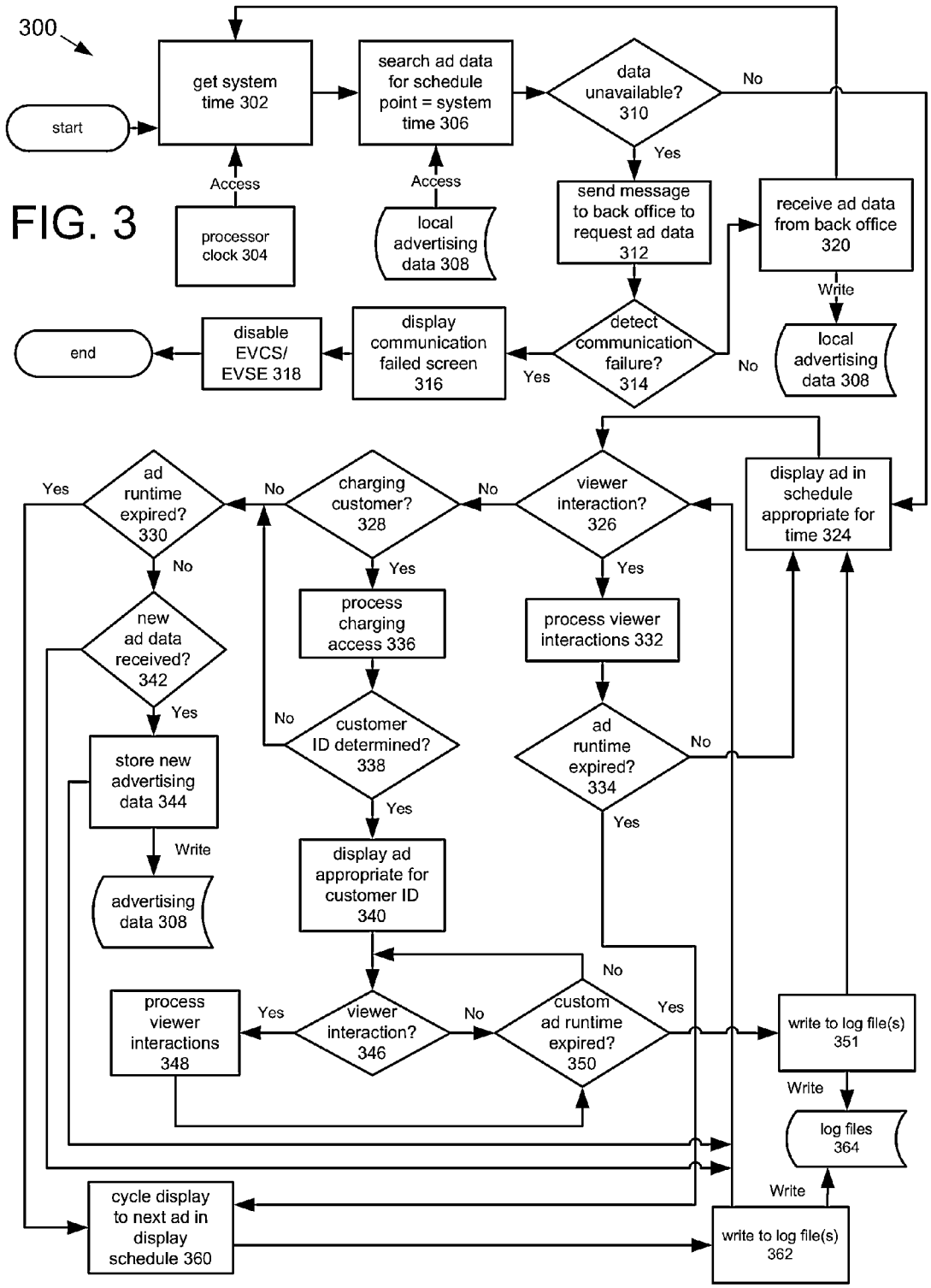
FIG. 3 is a flowchart of an exemplary method for operating an EVCS/EVSE according to an embodiment of the disclosed technology.

FIG. 3 is a flow chart 300 showing an exemplary process for operating an EVCS/EVSE and delivering advertising according to the disclosed technology. As noted above, the functionality shown in FIG. 3 can be implemented by computing hardware executing computer-executable instructions. The various procedures shown in FIG. 3 should not be construed as limiting, as any one or more of the procedures can be performed alone or in various other combinations and sub-combinations in accordance with the disclosed technology.

In particular embodiments, the EVCS/EVSE is operating in its normal mode and local advertising data (advertising data 308) is stored and available to display. The advertising data (advertising data 308) includes a schedule that determines a start time for advertising content to begin displaying (e.g., based on a time of day and calendar day), and a runtime that determines how long to display the advertising content (or the start time for the next advertising content display). The EVCS/EVSE uses the current system time to determine the first piece of advertising content in the schedule to begin displaying. In particular, the EVCS/EVSE obtains the system time (process block 302) from the system clock (e.g., system clock 304) and then searches the local advertising data (e.g., advertising data 308) to determine which advertising data corresponds to the current system time (process block 306). If for some reason, the EVCS/EVSE cannot read the advertising data (process block 310), it sends a message to the back office server to request that the back office server send the EVCS/EVSE a new set of advertising data (process block 312). If a communications error is detected when attempting this request (process block 314), a message is displayed indicating that there is a communications failure (process block 316) and, because the EVCS/EVSE cannot properly function without communications, the EVCS/EVSE is disabled (process block 318). Once advertising data is received from the back office server (process block 320), it is stored locally on the EVCS/EVSE and the process will begin again with the acts of determining the current time (process block 302) and which advertising content to display based on that time (process block 306). In other embodiments, the advertising data (advertising data 308) includes information indicating a duration that each advertisement is to be displayed but not a specific time for display. In such embodiments, the EVCS/EVSE can then repeatedly cycle through the advertisements, displaying each for its specified duration.

Once the EVCS/EVSE determines the advertising content to display, the EVCS/EVSE will begin displaying this content on the display apparatus (process block 324). If a viewer of the advertising interacts with the EVCS/EVSE via the touch screen display and/or the buttons/keypad (process block 326), the EVCS/EVSE will process those interactions as appropriate (process block 332). For example, the advertising content displayed to the viewer could prompt the viewer to press a button displayed on an area of the display apparatus or use physical buttons/keypad mounted on the EVCS/EVSE enclosure that causes a map to be displayed providing directions to the advertiser's business location, that requests that a text message or email coupon be sent to the viewer, that prints a coupon for the viewer at the EVCS/EVSE (e.g., using a printer at the EVCS/EVSE), or that allows the viewer to enter their personal information in order to receive more information about the advertiser's products or services, etc. The process block 332 represents the viewer's interactions with the particular advertising content until the viewer has completed all aspects of the interactive process (e.g., the viewer has entered all of the requested information, viewed the map, etc.).

The one or more advertisements displayed at the EVCS/EVSE can have a wide variety of formats and functions. In certain embodiments, the advertisements are for entities other than the EVCS/EVSE operator. For instance, in one advertising example, advertising is displayed to the viewer suggesting that the viewer would enjoy a beverage or food from a nearby merchant or restaurant. The advertising can ask the viewer to send a text message to a certain destination, or press a button on the EVCS/EVSE display apparatus to enter their phone number in order to receive a text of a coupon that the viewer can use to receive a discount on the advertised beverages or snacks. In other embodiments, the EVCS/EVSE can print a coupon at the EVCS/EVSE in response to interaction from the viewer.

In another advertising example, the advertisement can advertise a product and prompt the viewer to press a button on the EVCS/EVSE display apparatus to allow the viewer to enter their e-mail address to receive more information about the product. If the viewer presses the button, for example, a screen with a virtual keyboard can appear on the EVCS/EVSE display apparatus that allows the viewer to enter their email by pressing the keys on the virtual keyboard.

In another example, the identity of the current viewer is identified when the viewer plugs in their electric vehicle or is identified based on the means the EVCS/EVSE uses to determine access for billing purposes (e.g., based on the user's credit card or other card used to activate the EVCS/EVSE). In this example, specific advertising can be displayed to the viewer based on criteria specific to this viewer (e.g., based on demographic information about the user).

In another example, and for an EVCS/EVSE installed at a particular geographic location, advertising content that is pertinent to the geographic location is displayed and/or sent from the back office computer server.

In another example, an EVCS/EVSE is purchased or sponsored by a particular customer who wants advertising or customer loyalty program functions specific to their products or services to be featured on the EVCS/EVSE. In this example, the electric vehicle charging station advertising software running on the back office computer server can deliver the purchaser's or sponsor's specific content to the EVCS/EVSE. The EVCS/EVSE purchaser or sponsor can also develop content specific to certain geographic locations, specific store locations, or specific customer types. Further, the EVCS/EVSE purchaser or sponsor can develop time-sensitive promotions and use the electric vehicle charging station advertising software running on the back office computer server to develop and deploy this content to the EVCS/EVSE.

The information displayed at the EVCS/EVSE is not limited to advertising, however, and can be adapted for other purposes. For instance, in one example, one or more EVCSs/EVSEs are purchased by a vehicle fleet operator for use in charging the fleet's electric vehicles. The back office software application can provide the fleet operator with an interface that will allow them to develop and deploy content specifically to their EVCS/EVSE. This content could be maintenance or other notices that are specific to a specific vehicle or group of vehicles in the fleet, or to a specific driver or group of drivers using the vehicles in the fleet.

In another example, an interface is provided from the back office computer to law enforcement, national security, or other public-safety organizations so that these organizations can upload or develop content such as Amber Alerts and direct the deployment of this content to EVCSs/EVSEs within a certain geographic area, set a time of display for this content to display, etc. Once the law enforcement or public-safety content has been developed, the electric vehicle charging station advertising system can begin to display the time sensitive content as soon as it is received at the EVCS/EVSE, enabling public safety organizations to have a new and innovative method of quickly disseminating information on public, highly visible displays.

Returning to FIG. 3, the EVCS/EVSE will also react to any customers who wish to use the EVCS/EVSE to connect their electric vehicle with the electric power grid (process block 328). When the EVCS/EVSE detects that a customer wishes to use the charging station to connect their vehicle to the power grid (process block 328), it will perform the process of granting the customer access to use the charging station (process block 336). This process typically comprises transmitting user information (e.g., data indicative of the identity of the user) to the back office server. The user information can be obtained, for instance, from the user's credit card or network access card swiped at the EVCS/EVSE, from an RF identification carried by the user or associated with the user's vehicle, or obtained from data received from the user's vehicle when the user connects their electric vehicle to one of the charging ports of the EVCS/EVSE. The back office server can then determine whether a user is authorized by accessing user data using the user information received. If the user is recognized as an authorized user, a code can be transmitted from the back office to the EVSE/EVSE authorizing use of the EVCS/EVSE.

In certain embodiments, if the process of authorizing the user results in the positive identification of the customer so that the customer's name, gender and/or other personal traits can be determined (process block 338), the EVCS/EVSE can (in addition to completing the process of interconnecting the customer's vehicle to the power grid) switch the advertising content displayed to advertising content that is appropriate for this particular customer (process block 340). For example, the EVCS/EVSE can transmit user information (e.g., data indicative of the identity of a user) to the back office server. Based on the user information provided, user data can be accessed that includes demographic information about the user. The demographic information can include, for example, one or more of the user's interests, consumer preferences, consumer history, usage history, age, gender, household income level, employer, or home address. One or more targeted advertisements can then be selected based at least in part on this demographic information about the user. For example, the back office server can select the targeted advertisements based on advertising data associated with each advertisement that indicates the demographic for which the advertisement is intended. Information about the identity of the selected one or more advertisements can then be transmitted to the EVCS/EVSE, which can then load and display the selected advertisements from the advertisements stored locally at the EVCS/EVSE. In other embodiments, the content of the selected one or more advertisements is transmitted to the EVCS/EVSE after selection.

In some embodiments, at least some of the user data is stored locally at the EVCS/EVSE. Storing the user data locally reduces the number of communications that need to be made to the back office server and increases the speed with which transactions with the user can be performed. In particular embodiments, the locally stored user data is only a portion of the user data for the entire system. This partial database can be created based on a number of criteria. For example, the user data stored in the partial database can be for users with a home address within a certain radius of the EVCS/EVSE, for users who have used the EVCS/EVSE before (e.g., within the last x days), or a combination of such criteria. During operation, when the user of the EVCS/EVSE swipes their card (or otherwise provide user information to the EVCS/EVSE), software executing at the EVCS/EVSE can first evaluate the locally stored user data to determine whether the user is an authorized user. If the user is identified using the locally stored user data, demographic data about the user can be retrieved and one or more targeted advertisements can be selected and displayed to the user. If the user is not identified using the locally stored user data, then the EVCS/EVSE can transmit the user information to the back office server in order to retrieve an authorization code and demographic information (or selected advertising data) for the user.

Furthermore, in certain embodiments, the advertising data used to help select the one or more advertisements can also be stored locally at the EVCS/EVSE. Storing the advertisement data, including the demographic data for the advertisements, at the EVCS/EVSE can help reduce the bandwidth and communication time demands on the EVCS/EVSE system.

Returning to FIG. 3, if the customer interacts with the displayed advertising content (process block 346), these interactions will be processed by the EVCS/EVSE (process block 348). The content specific to this customer will continue to display until its runtime expires (process block 350) if the customer does not interact with it. Once this custom customer content's runtime has expired, the EVCS/EVSE software will revert to the regular scheduled advertising (process block 324).

Once the runtime for the regularly scheduled advertising content has expired (process block 330), the EVCS/EVSE will display the next scheduled advertising content (process block 360) for the runtime that is specified for this content in the advertising data. If at any point, the EVCS/EVSE receives new advertising data from the back office server, the EVCS/EVSE will overwrite the current advertising data with the newly received data (process blocks 342, 344).

One or more log files (log files 364) that record data about the advertising displayed can be created as or shortly before or after advertising content is displayed on the EVCS/EVSE. For example, as illustrated in FIG. 3, when the EVCS/EVSE displays the next scheduled advertisement after expiration of the previous ad (process block 360), the one or more log files (log files 364) can be updated (process block 362) to include information about the previously displayed advertisement. Similarly, when a custom advertisement displayed to the customer expires, the one or more log files (log files 364) can be updated (process block 351) to include information about the previously displayed custom advertisement. The information stored in the log files (log files 364) can include a variety of information, including, for example, one or more of data concerning the identity of the advertisement displayed, the time at which the advertisement was displayed, the duration of the display of the advertisement, any user interaction that occurred as a result of the advertisement, or an update of a counter indicating the number of times the advertisement was displayed. Periodically, the one or more log files 364 can be transmitted to the back office server for longer term storage (e.g., once a day, or other desirable time period). The log files transmitted to the back office server can then be used to collect and store data concerning the display of the advertisements across two or more of the EVCS/EVSEs. The data can be used to generate reports for advertising customers that indicate that their ad content was actually displayed, including detailed information about when and where.

Figure 5:
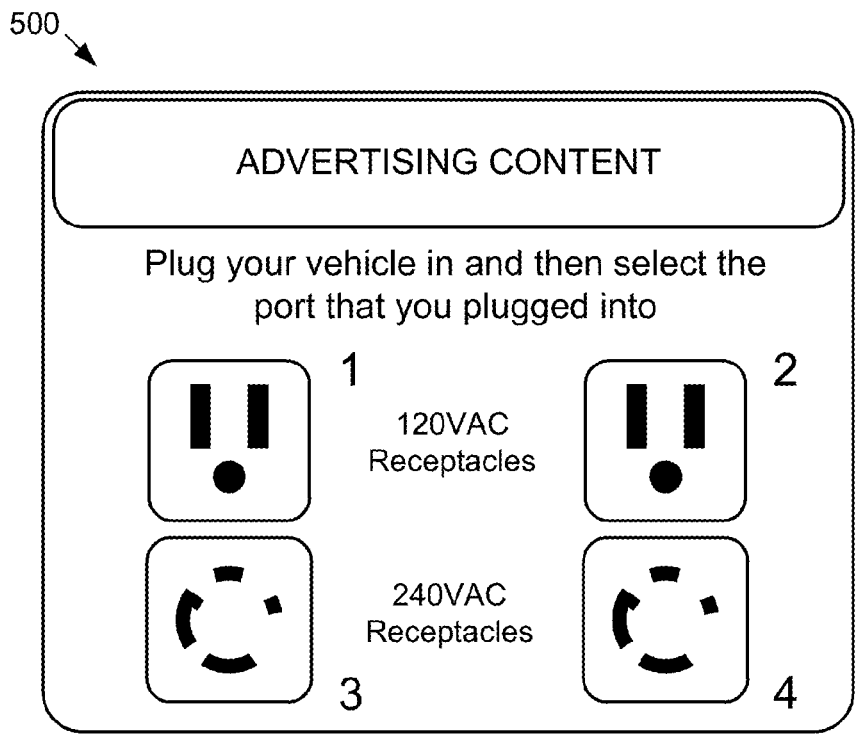
FIG. 5 illustrates an exemplary EVCS/EVSE screen showing a first possible advertisement placement.
Figure 6:
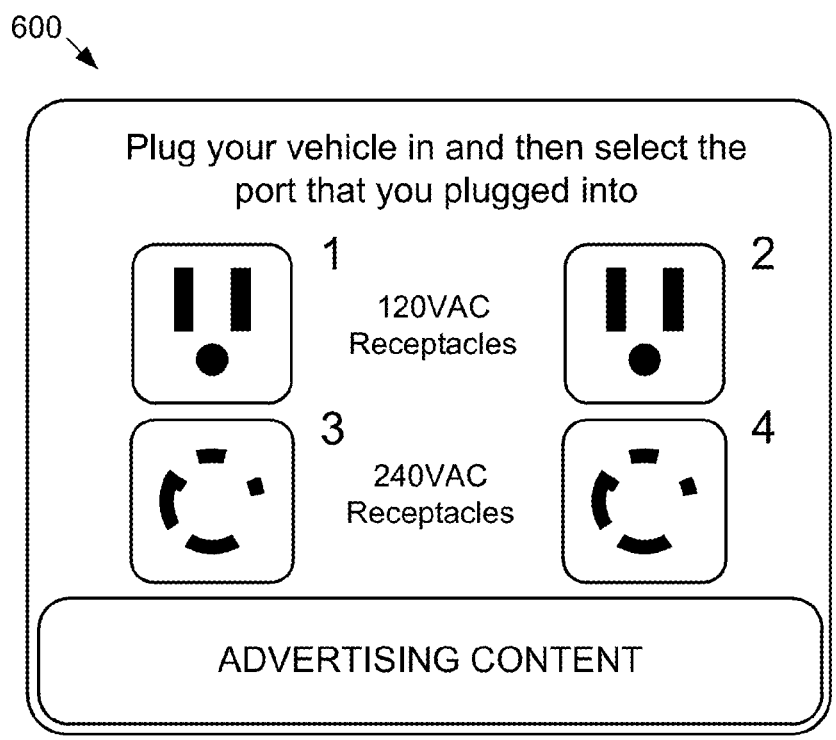
FIG. 6 illustrates an exemplary EVCS/EVSE screen showing a second possible advertisement placement.
Figure 7:
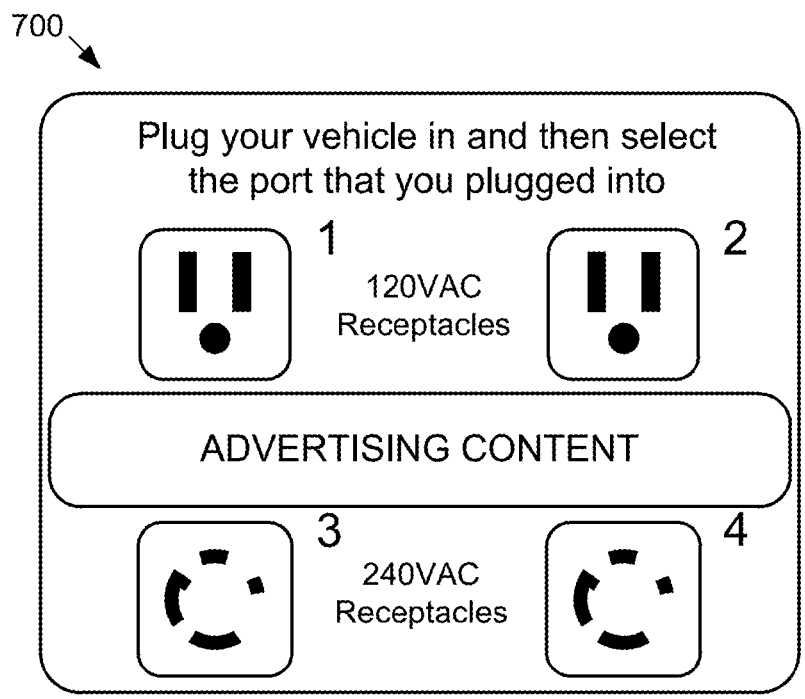
FIG. 7 illustrates an exemplary EVCS/EVSE screen showing a third possible advertisement placement.
Figure 8:
FIG. 8 illustrates an exemplary EVCS/EVSE screen showing a fourth possible advertisement placement.

FIGS. 5-8 show exemplary screen shots of a display on an EVCS/EVSE. The screen shots of FIGS. 5-8 show that advertising content can be included at various locations on the display apparatus but should not be considered as limiting because the advertising can be located elsewhere on the display (e.g., around the perimeter of the display, in the corners of the displays, and other such locations). FIGS. 5-7 show potential locations for the advertising content on the EVCS/EVSE display screen while the EVCS/EVSE is being used to charge electric vehicles. FIG. 8 shows that when the EVCS/EVSE is not being used to charge electric vehicles, most of the available display area on the EVCS/EVSE display screen can be used to display advertising content with a button for an electric vehicle driver to press to begin using the EVCS/EVSE to charge their vehicle. More specifically, FIG. 5 shows an exemplary screen shot 500 of an EVCS/EVSE display in which advertising is displayed in a top region of the display (e.g., in the top half of the display) as the display provides instructions or other information about using the EVCS/EVSE. FIG. 6 shows an exemplary screen shot 600 of an EVCS/EVSE display in which advertising is displayed in a bottom region of the display (e.g., in the bottom half of the display) as the display provides instructions or other information about using the EVCS/EVSE. FIG. 7 shows an exemplary screen shot 700 of an EVCS/EVSE display in which advertising is displayed in a central region of the display (e.g., between information on the top and bottom of the display) as the display provides instructions or other information about using the EVCS/EVSE. FIG. 8 shows an exemplary screen shot 800 of an EVCS/EVSE display in which advertising is displayed across a majority of the display. The advertising shown in FIG. 8 can be displayed at the EVCS/EVSE as the EVCS/EVSE waits for user interaction (e.g., at process block 326). As shown in screen shot 800, the display can include an interactive region that a user can press on the touch screen in order to start charging operations at the EVCS/EVSE. An exemplary charging procedure that can be implemented at the EVCS/EVSE is shown in flow chart 900 of FIG. 9.

Figure 20:
FIG. 20 illustrates an exemplary EVCS/EVSE screen showing an example advertisement.
Figure 21:
FIG. 21 illustrates an exemplary EVCS/EVSE screen showing a further example advertisement.

The manner and style in which advertising can be displayed can vary widely from implementation to implementation. FIGS. 20 and 21 show two further examples of how advertising can be displayed on the display screen of the EVCS/EVSE. For instance, FIG. 20 shows a screen with advertising content in which the user is asked to identify a payment method. FIG. 21 shows a screen with advertising content in which the user is asked to identify the power receptacle into which the user's vehicle is plugged.

Figure 4:
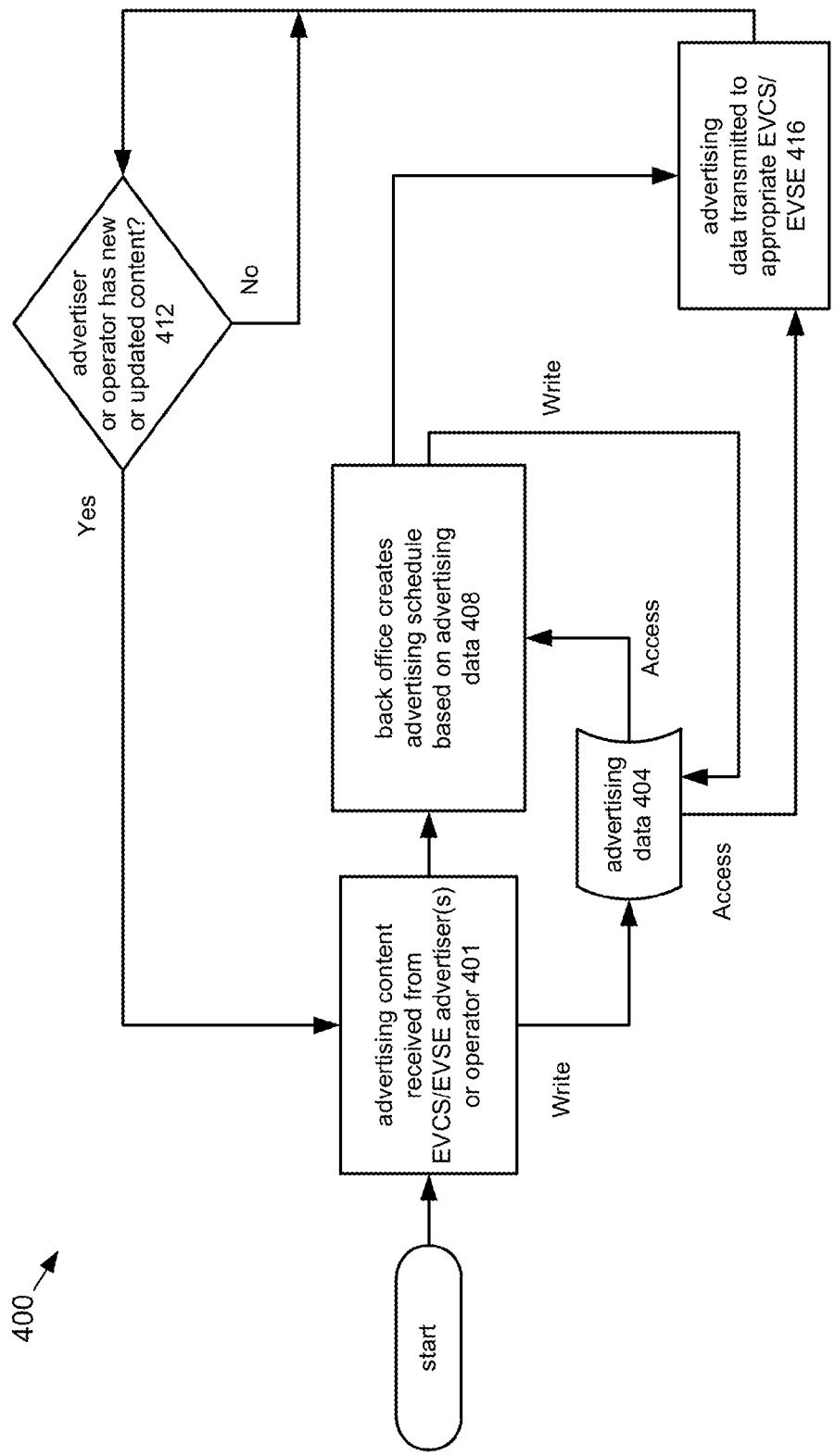
FIG. 4 is a flowchart of an exemplary method for operating a back office system supporting the EVCS/EVSE.

FIG. 4 is a flow chart 400 showing an exemplary process performed by a back office server coupled to an EVCS/EVSE implementing the method shown in FIG. 3 or other such method. As noted above, the functionality shown in FIG. 4 can be implemented by computing hardware executing computer-executable instructions. The various procedures shown in FIG. 4 should not be construed as limiting, as any one or more of the procedures can be performed alone or in various other combinations and subcombinations in accordance with the disclosed technology.

According to the method shown in FIG. 4, advertising content is received from an advertising customer or the EVCS/EVSE operator (process block 401). For example, in certain embodiments, an advertising customer or the EVCS/EVSE operator can create and upload advertising content (e.g., images, motion pictures, interactive applications, audio, etc.) via a web site or other user interface. In certain embodiments, the advertising content received can include scheduling information or other information about how to display an advertisement. For example, in particular embodiments, the advertising customer or EVCS/EVSE operator can select one or more of the following for an advertisement: the geographic location(s) they would like the ad to be shown, the days and hours of the day they would like the ad to be shown, the duration the ad is to be displayed, or the traits of the viewers that they would like to target with the ad. For instance, in certain embodiments, the advertiser or EVCS/EVSE operator is presented with available times of the day through a list or pull-down menu from which they can select a desired time slot. Times that are unavailable can be shown as unavailable, or not displayed at all. Other methods of informing the advertiser or EVCS/EVSE operator of available and/or unavailable times can also be used. The time periods available can vary from implementation to implementation and can include a wide variety of time periods (e.g., 5 minutes, 10 minutes, 30 minutes, 1 hour, or 2 hour periods). In some embodiments, the advertiser or EVCS/EVSE operator selects a duration for which an advertisement is to be displayed during a fixed period of time (e.g., 1 day). The advertisement can then be placed in a list of advertisements, which is cycled through during EVCS/EVSE operation. The duration of display can be any suitable duration (e.g., 5 minutes, 10 minutes, 30 minutes, 1 hour, or 2 hours). In such embodiments, the time when the user is interacting with the EVCS/EVSE may not count as part of the advertisement duration so the actual time of display may vary from day to day.

The advertising content received is saved as advertiser data (advertising data 404). The back office server builds the advertising schedule for each individual EVCS/EVSE based on the complete data set of advertising data (process block 408). For example, the advertising schedule for an individual EVCS/EVSE can be created using advertising content selected for display in the geographic region of the EVCS/EVSE and using the times or display durations selected by the advertisers or the EVCS/EVSE operator. Once the back office software has created the advertising schedule for a EVCS/EVSE, it will transmit to the EVCS/EVSE that station's advertising data (process block 416). The advertising data can be transmitted, for example, as computer-readable data via the communication link. For example, the advertising data can be compressed using a Java gzip technique or any other suitable image or video compression technique or standard (e.g., JPEG, JPEG XR, h.264, VC-1, or other such techniques or standards). At any time, one or more of the advertisers (or the EVCS/EVSE operator) can update the existing advertising content or add new advertising content (process block 412). If this is done, the advertising data (advertising data 404) is updated with the new or modified advertising content (process block 401).

Figure 9:
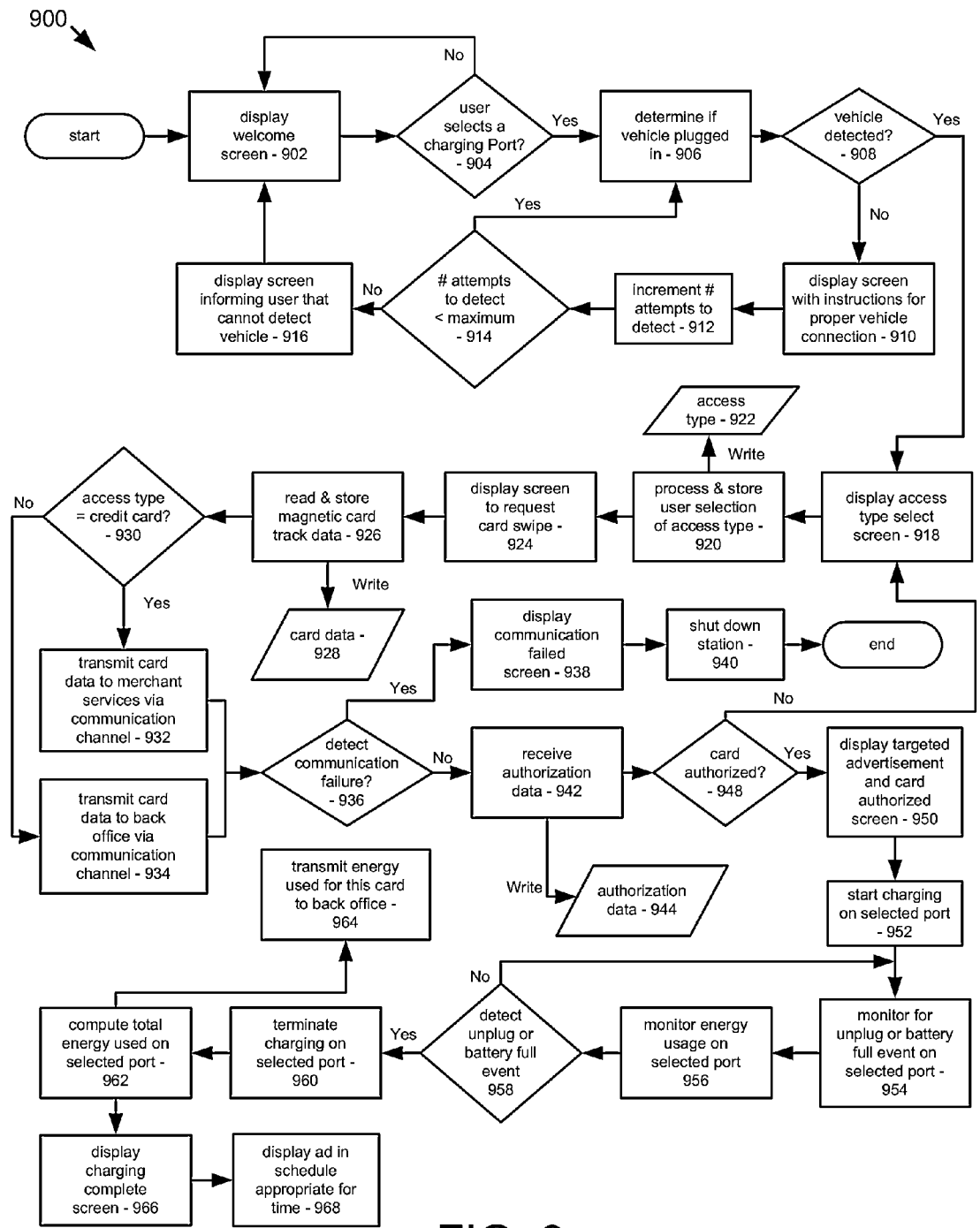
FIG. 9 is a flowchart of an exemplary method for performing a charging operation at an EVCS/EVSE according to an embodiment of the disclosed technology.

FIG. 9 is a flow chart 900 showing an exemplary process for performing a charging procedure at an EVCS/EVSE. The exemplary process shown in flow chart 900 can be performed in conjunction with the process shown in flow chart 300 of FIG. 3. In particular, the process shown in flow chart 900 can be performed as part of processing access to the charging station (process blocks 328, 336, 338) and displaying targeted advertising to the user (process blocks 340, 346, 348, 350). As noted above, the functionality shown in FIG. 9 can be implemented by computing hardware executing computer-executable instructions. The various procedures shown in FIG. 9 should not be construed as limiting, as any one or more of the procedures can be performed alone or in various other combinations and subcombinations in accordance with the disclosed technology.

Figure 11:
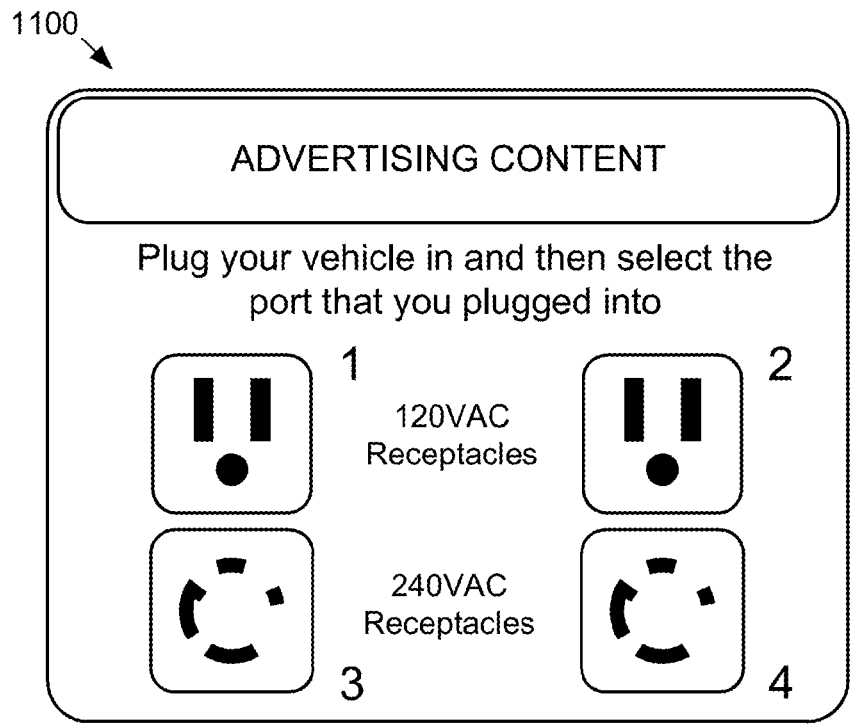
FIG. 11 illustrates an exemplary EVCS/EVSE screen showing a first possible welcome screen to a user who desires to charge an electric vehicle.
Figure 15:
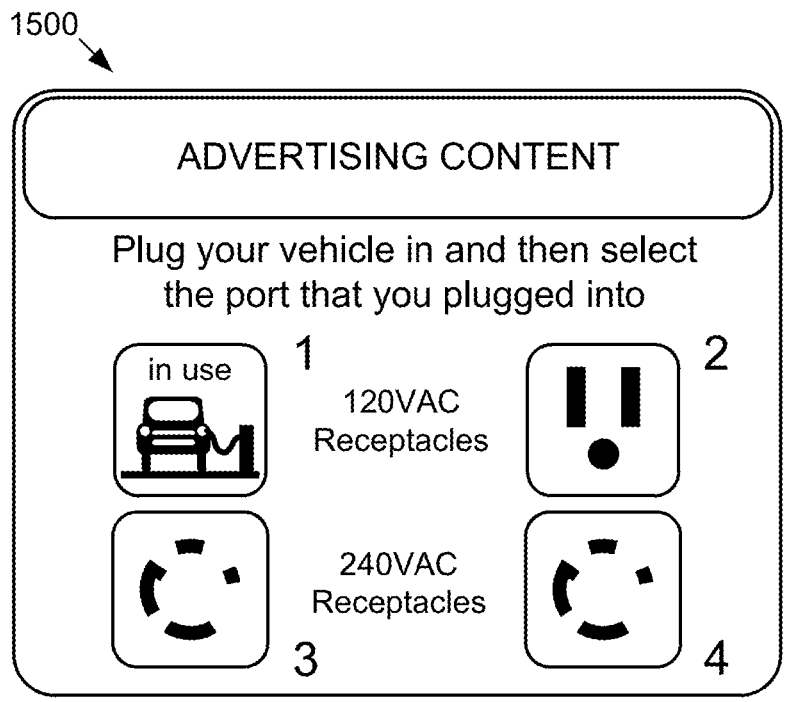
FIG. 15 illustrates an exemplary EVCS/EVSE screen showing a second possible welcome screen to a user who desires to charge an electric vehicle and which indicates that a charging port is in use.
Figure 16:
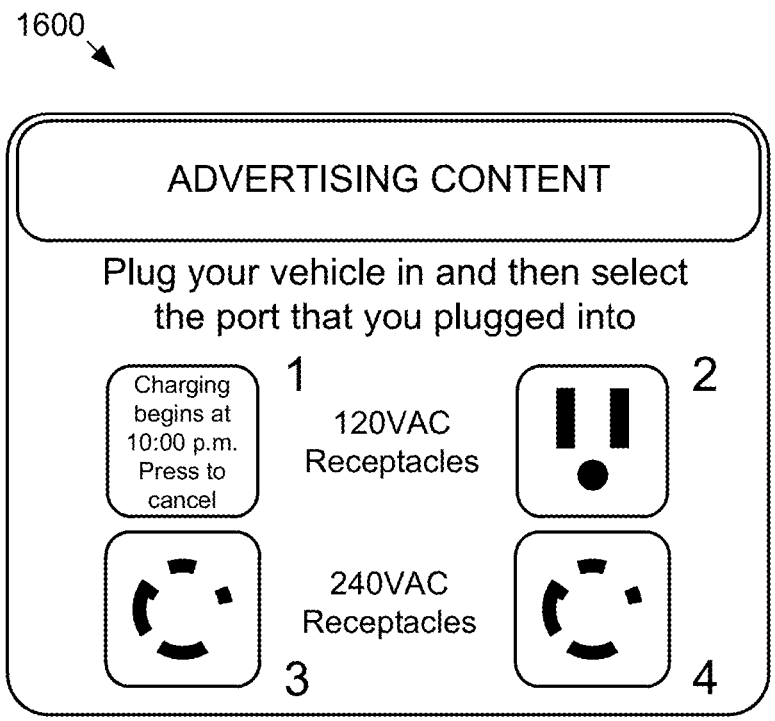
FIG. 16 illustrates an exemplary EVCS/EVSE screen showing a third possible welcome screen to a user who desires to charge an electric vehicle and which indicates that charging on one of the charging ports will begin at a later time.
Figure 17:
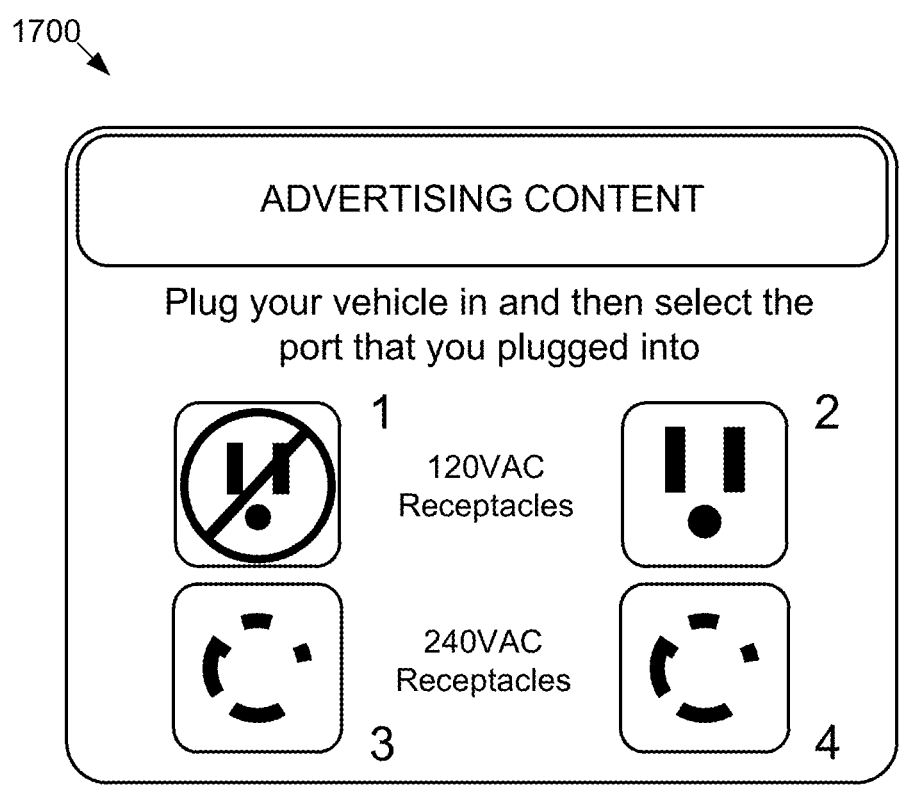
FIG. 17 illustrates an exemplary EVCS/EVSE screen showing a fourth possible welcome screen to a user who desired to charge an electric vehicle and which indicates that one of the charging ports is unavailable.

In particular embodiments, and after the user indicates that they want to perform a charging operation, the EVCS/EVSE 240 will display a welcome screen (process block 902). An exemplary welcome screen that can be displayed is shown in screen shot 1100 of FIG. 11, which also shows advertising content. This welcome screen can also display to the user 260 which charging ports are currently in use and which ports are available at the EVCS/EVSE. For example, FIG. 15 is a screen shot 1500 showing an example of a welcome screen in which one vehicle is already connected to the EVCS/EVSE and charging. FIG. 16 is a screen shot 1600 showing an example of a welcome screen in which one vehicle is already connected and is waiting to be charged later. FIG. 17 is a screen shot 1700 showing an example of a welcome screen in which one port of the charging station is inoperative and unavailable for use. FIGS. 15-17 also include advertising content as described above.

When the user selects a charging port to use (process block 904), the selected port is monitored to determine whether a vehicle is plugged into the selected port (process blocks 906, 908). If a vehicle is not detected at the selected port, the EVCS/EVSE displays a message to the user stating that the EVCS/EVSE cannot detect a vehicle plugged into the selected port and instructs the user on how to correctly connect the vehicle to the EVCS/EVSE (process block 910). The EVCS/EVSE will again attempt to sense a vehicle plugged into the selected port. If a vehicle is still not detected, the EVCS/EVSE will again inform the user that it cannot detect a vehicle and provide connection instructions. This cycle will be repeated a number of times (e.g., a predetermined or operator-selected number of times). For example, for each attempt to detect a vehicle at the selected port, a variable storing the number of attempts can be incremented (process block 912). The number of attempts can then be compared to the maximum number of attempts allowed (process block 914) to determine whether further attempts should be made or whether a new display screen should be displayed to the user informing the user that the EVCS/EVSE cannot detect their vehicle and that the user should select a different port or that the user cannot use the EVCS/EVSE (process block 916).

Figure 12:
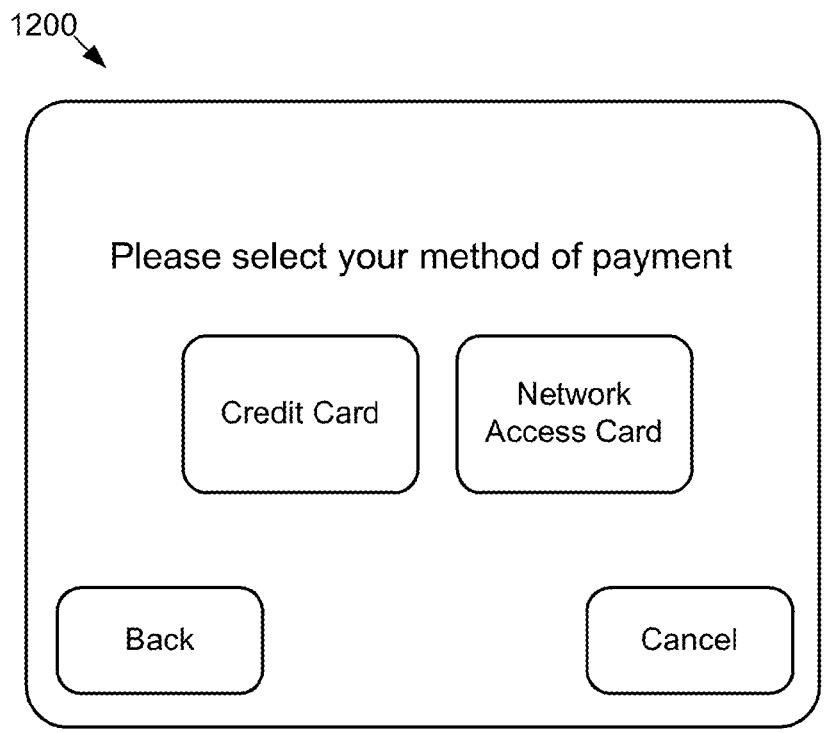
FIG. 12 illustrates an exemplary EVCS/EVSE screen showing a possible screen for identifying whether the user has a network access card or whether the user will use a credit card.

If the EVCS/EVSE does detect a vehicle plugged into the selected port (process block 908), the EVCS/EVSE will display a screen requesting that the user select an access type (process block 918). FIG. 12 is a screen shot 1200 showing an example of a suitable access type selection screen. The access type determines where the customer data is transmitted. Thus, the access type is processed and temporarily stored (process block 920) as access type data 922. In one particular embodiment, the access types include access using a credit card or access using a network access card associated with the operator of the EVCS/EVSE. The EVCS/EVSE then displays a screen requesting that the user swipe their network access card (process block 924). Information from the card is then read and stored (process block 926) as card data 928. Using the stored access type data 922, a determination is made as to whether the access type was access using a credit card (process block 930). If the access type was a credit card, the card information (card data 928) will be transmitted to the appropriate merchant services via the communication link of the EVCS/EVSE (process block 932). If the access type was not a card associated with the operator of the EVCS/EVSE, the card data (card data 928) will be transmitted to the back office server via the communication link (process block 934). During any communication, a determination is made as to whether there exists a communication failure (process block 936). If there is a communications problem and the card data is not able to be sent, the EVCS/EVSE will display a failure message (process block 938) and display a message stating that the entire charging station is disabled for a maintenance issue (process block 940). Furthermore, access to the EVCS/EVSE can be granted using a different type of access mechanism, such as an RFID device that is carried by the user or associated with their electric vehicle or through data received from the user's vehicle when the user connects their electric vehicle to one of the charging ports of the EVCS/EVSE.

Figure 13:
FIG. 13 illustrates an exemplary EVCS/EVSE screen showing a possible screen providing targeted advertising to the EVCS/EVSE user.
Figure 14:
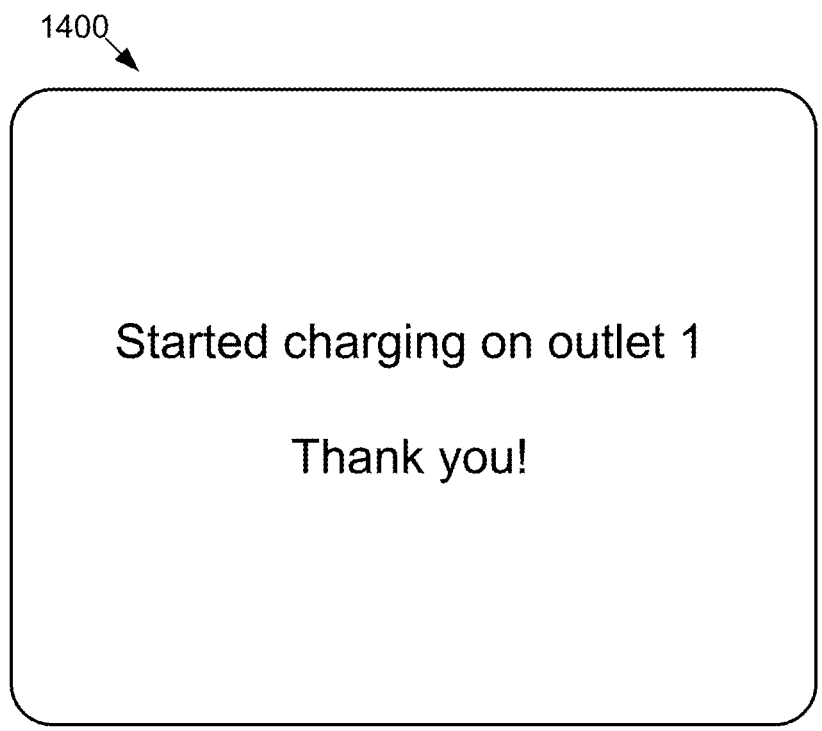
FIG. 14 illustrates an exemplary EVCS/EVSE screen showing a possible authorization screen to the user of the EVCS/EVSE.

If the EVCS/EVSE is able to successfully send the card data to the back office server, the EVCS/EVSE will wait to receive authorization data from the back office server. Once authorization data is received (process block 942), the data is stored as authorization data 944 and a determination is made as to whether the card is authorized (process block 948). If the card is not authorized, the EVCS/EVSE will again display the access type select screen (process block 918) to allow the user to use a different card to gain access. If the card is authorized to use the EVCS/EVSE, the EVCS/EVSE can display a screen indicating that the card is authorized along with an advertisement that targets the particular user (process block 950). Screen shot 1300 of FIG. 13 shows an example of a targeted advertisement that can be displayed to the user. As shown in FIG. 13, the targeted advertisement can include a touch screen button that the user must select in order to continue to the next screen. The targeted advertisement can be selected based on information about the user determined from stored user data (e.g., user data 170). For example, the user data can include demographic information about the user (e.g., age, sex, personal interests, home address, make and model of electric vehicle) that can be used to select an advertisement that is appropriate for the user and their likely consumer preferences. Screen shot 1400 of FIG. 14 shows a card authorized screen that can appear after the user selects to continue from the targeted advertisement. It should be noted that in certain embodiments, charging is made available to the user free of charge so that a credit card and/or network access card is unnecessary. In certain implementations of such embodiments, the system may offer free vehicle charging only to those users who are members of the charging station network and swipe their network access card (or RFID) prior to charging.

Charging can then begin at the selected port (process block 952). During charging, the selected port is continuously monitored for an unplug or a battery fully charged event (process blocks 956, 958). If an unplug or battery fully charged event is detected, the EVCS/EVSE will terminate the charging on the selected port (process block 960), compute the total energy used on that port (process block 962) and transmit the total energy used to the back office server (process block 964) so that the charging session can be closed out. Charging statistics can then be temporarily displayed on the screen on a charging complete screen (process block 966). The screen will eventually revert to the advertisement scheduled to be displayed at the EVCS/EVSE during the relevant time period (process block 968, which corresponds to process block 324 of FIG. 3).

Figure 10:
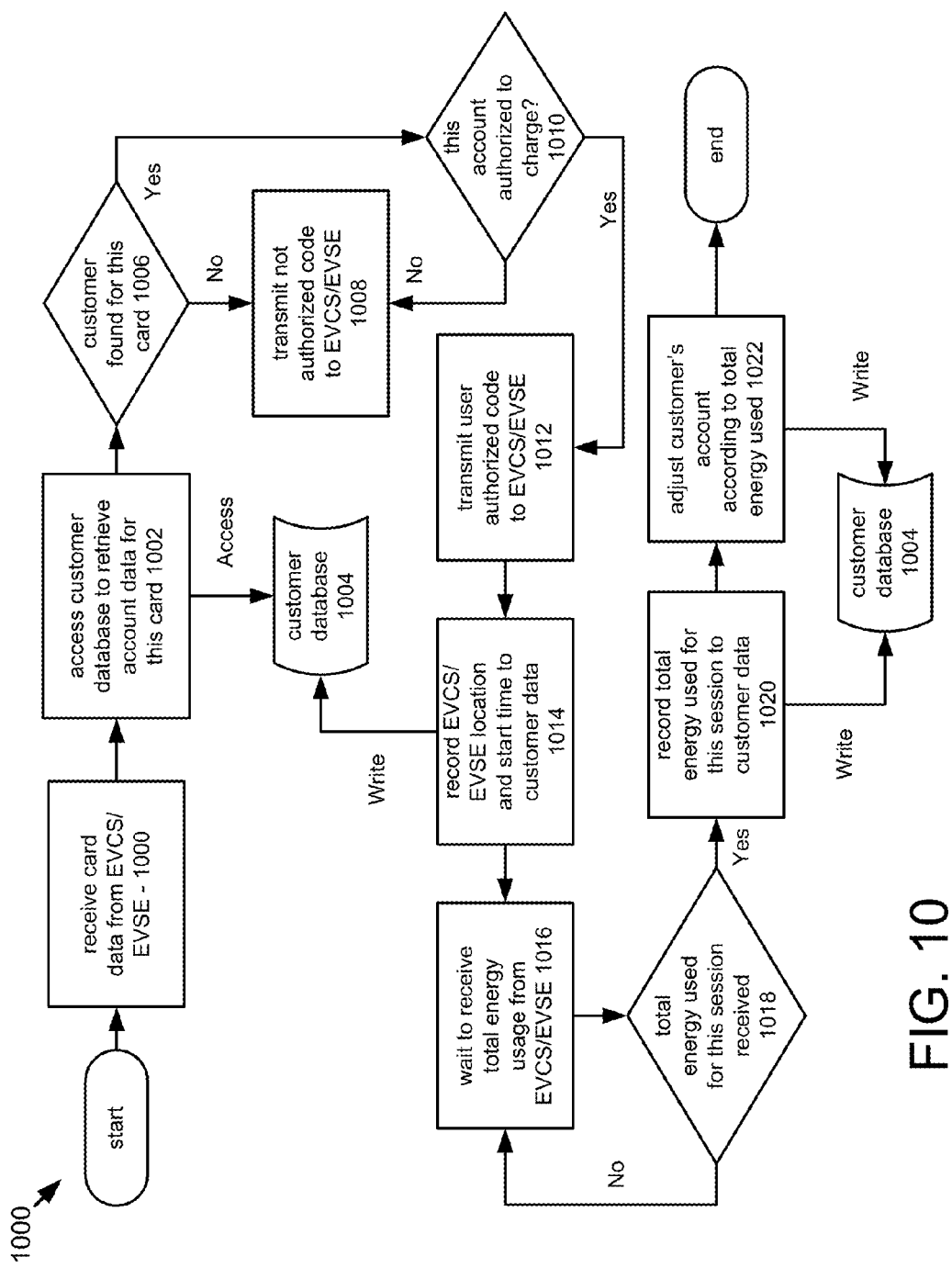
FIG. 10 is a flowchart of an exemplary method for operating a back office system supporting the charging operation performed by the EVCS/EVSE.

FIG. 10 is a flow chart showing an exemplary process performed by a back office server coupled to an EVCS/EVSE implementing the method shown in FIG. 9 or other such method. As noted above, the functionality shown in FIG. 10 can be implemented by computing hardware executing computer-executable instructions. The various procedures shown in FIG. 10 should not be construed as limiting, as any one or more of the procedures can be performed alone or in various other combinations and subcombinations in accordance with the disclosed technology.

When the back office server receives card data from an EVCS/EVSE (process block 1000), the back office server will access a customer database 1004 (process block 1002) and determine if there is a customer or user in the customer database corresponding to the received card data (process block 1006). If a corresponding customer or user is not found, a code is transmitted to the EVCS/EVSE indicating that the card is not authorized (process block 1008). If a corresponding customer is found in the database, the back office server will use this customer's data to determine if the customer is allowed access to this EVCS/EVSE (process block 1010). This determination could be based on a financial analysis (e.g., an analysis to determine whether there are sufficient funds in the customer's account), a membership analysis (e.g., an analysis to determine whether the customer is a member of an authorized group of members who can use this station), or some other criteria or combination thereof. For example, in some embodiments, charging operations are provided at no cost or at some nominal or other cost below the market price to users who have joined the charging network (e.g., by providing certain personal information that allows for targeted advertising). If the customer is authorized to use the EVCS/EVSE, a code is sent to the EVCS/EVSE stating that the user is authorized (process block 1012). The back office server can record the location and start time of the charging session as part of the customer's data stored in the customer database 1004 (process block 1014). The back office server can then wait to receive a message from the EVCS/EVSE indicating the total energy usage from the current charging session (process blocks 1016, 1018). Once the total energy usage message is received, the back office server can record the total energy used for this session (process block 1020) and update the customer's data stored in the customer database 1004 accordingly (process block 1022). In other embodiments, charging is provided free of charge to all users of the charging station, eliminating the need for any authorization at the EVCS/EVSE.

III. General Considerations for Implementing Embodiments of the Disclosed Technology Embodiments of the disclosed electric vehicle charging system provide a networked outdoor advertising system built around the emerging electric vehicle ("EV") and charging infrastructure industries. Embodiments of the system can be used to provide a publically accessible, networked smart charging system in cities or other communities having a large and established outdoor advertising market. With an installed base in place, embodiments of the disclosed electrical vehicle charging system can offer an iconic, digital advertising platform that stands out in a cluttered outdoor space. The system can be used to engage the driver parking their car at work, school, place of worship, shopping center or other such destination where it is desirable to make contact with a potential consumer.

Embodiments of the disclosed electric vehicle charging system have full-color, touch screens that can be used for display, geo- and demographic-based advertisements, and for providing other value-added messaging capabilities to charging station customers.

By using electric vehicle supply equipment to establish an outdoor digital advertising network, embodiments of the disclosed technology can operate and generate revenue unlike any other electric vehicle supply equipment manufacturer. For example, analysis has shown that significantly more revenue can be generated from selling advertising for such charging stations than from purely selling electricity or access to that electricity. Thus, and in contrast to other electric vehicle charging systems, embodiments of the disclosed system can generate revenue entirely or at least partially through advertising. For example, in certain embodiments of the disclosed systems, the electricity supplied by the system is provided to the electric vehicle user free of charge. Consequently, embodiments of the disclosed technology can be installed, maintained, and operated free of charge to the EV driver. (EV drivers can also be charged a reduced or nominal price for the electricity they use (e.g., less than the market price of electricity).) By contrast, many EVCS/EVSE manufacturers are attempting to design and sell the lowest cost EVCS/EVSE with a business model built around decreasing manufacturing costs and increasing market penetration faster than their competitors to allow them to earn an acceptable rate of return on their manufacturing activities. Such manufacturers will therefore compete with operators of the disclosed technology for installation locations based solely on the equipment and installation costs that they can offer. But the advertising capabilities of the disclosed technology allow the EVCSs/EVSEs of embodiments of the disclosed technology to be offered to installers, installation partners, or installation-site owners (e.g., municipalities, utilities, or private entities) at a cost of $0 or at a cost reduced to a small or nominal amount other than $0 but less than the market price for installation.) Further, the EVSE installers, installation partners, or installation-site owners can receive a portion (e.g., a percentage) of the advertising revenue, providing them with a further incentive to install embodiments of the disclosed technology rather than conventional charging equipment. Revenue sources for embodiments of the disclosed technology alternatively or additionally include one or more of the following: access to the electricity from the charging stations, purchase and installation of the charging stations, or supply of maintenance and other data which can be pulled from the vehicle and end user from charging events.

Using embodiments of the disclosed technology, a variety of customers (or users) can be served. For example, one of the customers is the EV driver using a charging station. Embodiments of the charging station and supporting back office infrastructure described above can offer these customer an open payment system with a variety of options, flexibility, and a quick, safe, easy-of-use charging experience. Other customers include advertising customers. Embodiments of the networked-based system described above (which can be a cloud-based system) allows advertising customers to establish and control their advertising campaigns.

Potential advertisers who will use the digital advertising network created by embodiments of the disclosed technology include those advertisers seeking to gain visibility, awareness and affinity primarily with the desirable EV driver demographic and secondarily with consumers who travel past implementations of the disclosed charging stations at, or near, the point of sale in urban and commercial settings.

In certain implementations of the disclosed electric vehicle charging system, EV drivers can register to become a member of the network of charging stations (e.g., using a web site, written registration form, or other such registration means). The EV driver can provide personal information as part of the registration process and, as members of the network, receive free or reduced cost use of all (or a selected subset of) charging stations in the system. The system can then be used to offer advertisers a digital advertising network to deliver targeted advertising to registered members (e.g., using the personal information provided during the registration process) in addition to geographically targeted advertising to display to consumers who travel past charging stations in the system. EV drivers who are not currently registered with the network can pay for access to stations using a suitable payment method (e.g., a credit card or credit account). Such non-member drivers can be offered the opportunity to join as a network member when they access a station with a credit card.

As more fully explained above, embodiments of the disclosed electric vehicle charging system include one or more charging stations, a back office system (e.g., a cloud-based back office system) supporting charging station usage payments and the advertising campaigns, and the wireless communications network linking the charging stations to the back-office system.

Certain implementations of the disclosed technology use a peer-to-peer messaging system that ensures data is transmitted securely, efficiently and reliably between charging stations and various end points (e.g., the back office or the vehicle manufacturer(s)). For instance, in particular implementations, the OpMessaging peer-to-peer messaging system available from Optimization Technologies™ is used. The messaging system can be used to manage the advertising network on a real-time basis, either nationally or location specific. This system is scalable as communications increase, as the number of vehicles increase, and as the number of charging points increase.

In particular embodiments of the disclosed electric vehicle charging system, any one or more of the following types of advertising and promotions can be provided to the display of a charging station: (1) static display ads (these are static graphical images that are displayed on the display device of the charging station (e.g., on an LCD)); (2) animated ads (these are animated or video advertisements that are more like commercials that are displayed on the display device of the charging station (e.g., on an LCD)); and (3) interactive ads (these are either static or animated ads or a hybrid of the two that also incorporate an interaction with the user).

Embodiments of the networked electric vehicle charging system can be linked through a centralized computer system to change static advertisements on any number of charging station displays in the system. This flexibility allows advertisers to change messaging over the course of a day, or campaign, and the ability to focus on narrow target demographics at different times of the day. Embodiments of the electric vehicle charging system can be used to provide targeted advertising messages based on geographic location and the end user's (EV driver) recorded preferences. For example, in certain embodiments, the back-end server maintains a database of charging activity for EV drivers. This data can be used to determine driving patterns or potentially routines of the members of the system. For example, parking patterns can be determined using this information. Additionally, the information can be used to determine where the member works. Additionally, the database can store data about a member's personal or consumer preferences or characteristics (provided when the member signed up, or periodically updated by the member). This data can be used to deliver targeted advertising to members when they are using a charging station in the system. For example, once an EV driver has swiped their network access card at the charging station, the identity of the member can be determined and their personal data accessed. The back-end server can then transmit a targeted advertisement or message to the member at the station. The member data stored by the back-end server can also be used to deliver targeted advertising to members when they are using any access point to the network (e.g., the web site or smart phone application for the system).

The tables below identifies some of the features discussed above, as well as other features that can be used alone or in combination with one another in various embodiments of the disclosed technology:

TABLE 1

EV Charging Features & Benefits

| Features | Benefits |
| --- | --- |
| Multiple Vehicle Charging Capacity | Smaller capital cost for installation; makes use of limited space (multiple housing locations, on street parking) |
| Charging station display apparatus | Ease of use |
| Text message or email when battery charging is started, complete or interrupted | Saves time by letting end-user know the current state of charging event without having to go to the vehicle. |
| Paperless Parking Meters | Gives municipalities an additional revenue source, and also saves labor costs by not having to check each individual vehicle for a current parking receipt |

TABLE 1-continued

EV Charging Features & Benefits

| Features | Benefits |
| --- | --- |
| Customizable Access | Gives municipalities and/or system operator multiple options for end users to access the charging station; this includes allowing for one-time transactions or using loyalty cards and/or stored value cards |

TABLE 2

Outdoor Advertising Features & Benefits

| Features | Benefits |
| --- | --- |
| Charging station display apparatus | Provides an easy-to-see digital advertising display |
| Networked stations | Allows for target advertising locally, regionally and nationally. |
| Touchscreen | Allows advertiser interaction with end user to receive coupons and other collateral |
| EVSE users | Specific and desirable market for advertising engagement |

IV. Further Embodiments

Having described and illustrated the principles of the disclosed technology in the detailed description and accompanying drawings, it will be recognized that the various embodiments can be modified in arrangement and detail without departing from such principles. Furthermore, any features or aspects of the disclosed embodiments can be used in various combinations and subcombinations with one another. For example, the following paragraphs describe various possible embodiments of the disclosed technology.

In one embodiment described herein, a method is disclosed that comprises displaying one or more advertisements on a display device of an EVCS or EVSE. The advertisements can be displayed at any one or more of multiple locations on the display device. The advertisements can be selected based at least in part on one or more of the following criteria: a location of the EVCS/EVSE, an identity of a viewer, chronological factors, meteorological conditions, make of a vehicle plugged into the EVCS/EVSE, model of the vehicle plugged into the EVCS/EVSE, year of manufacture of the vehicle plugged into the EVCS/EVSE, or installed equipment on the vehicle plugged into the EVCS/EVSE. The advertisements can comprise one or more of banner ads, box ads, still images, motion pictures, audio clips, commercials, or software computer applications configured to request and accept interaction with the viewer. The method can further comprise receiving input from a viewer in response to the advertisements, the input being received via a touch screen or keypad associated with the EVCS or EVSE. For example, the method can comprise causing a virtual numerical, alpha, or alpha-numerical keyboard to be displayed to the viewer, the virtual numerical, alpha, or alpha-numerical keyboard being configured to allow the viewer to input data in response to one or more of the advertisements. The method can further comprise controlling a charging or discharging operation for one or more vehicles coupled to the EVCS or EVSE. The method can also further comprise controlling a charging operation for one or more vehicles coupled to the EVCS or EVSE, wherein the charging operation is provided at no cost to a user of the electric vehicle. The method can also comprise transmitting information about an identity of a user of an electric vehicle coupled to the EVCS or EVSE; receiving information indicating that the user of the electric vehicle is authorized to use the EVCS or EVSE; and allowing the user of the electric vehicle to charge the electric vehicle without receiving monetary compensation from the user, causing an account associated with the user to be debited, or causing a credit card charge to be made to a credit card account associated with the user.

Another disclosed embodiment comprises one or more non-transitory computer-readable media storing computer-executable instructions which when executed by a computer cause the computer to perform a method, the method comprising displaying one or more advertisements on a display device of an EVCS or EVSE. The advertisements can be displayed at any one or more of multiple locations on the display device. The advertisements can be selected based at least in part on one or more of the following criteria: a location of the EVCS or EVSE, an identity of a viewer, chronological factors, meteorological conditions, make of a vehicle plugged into the EVCS or EVSE, model of the vehicle plugged into the EVCS or EVSE, year of manufacture of the vehicle plugged into the EVCS or EVSE, or installed equipment on the vehicle plugged into the EVCS or EVSE. The advertisements can comprise one or more of banner ads, box ads, still images, motion pictures, audio clips, commercials, or software computer applications configured to request and accept interaction with the viewer. The method can further comprise receiving input from a viewer in response to the advertisements, the input being received via a touch screen or keypad associated with the EVCS or EVSE. For example, the method can further comprise causing a virtual numerical, alpha, or alpha-numerical keyboard to be displayed to the viewer, the virtual numerical, alpha, or alpha-numerical keyboard being configured to allow the viewer to input data in response to one or more of the advertisements. The method can also comprise controlling a charging or discharging operation for one or more vehicles coupled to the EVCS or EVSE. For example, the method can further comprise controlling a charging operation for one or more vehicles coupled to the EVCS or EVSE, wherein the charging operation is provided at no cost to a user of the electric vehicle. The method can also further comprise transmitting information about an identity of a user of an electric vehicle coupled to the EVCS or EVSE, receiving information indicating that the user of the electric vehicle is authorized to use the EVCS or EVSE, and allowing the user of the electric vehicle to charge the electric vehicle without receiving monetary compensation from the user, causing an account associated with the user to be debited, or causing a credit card charge to be made to a credit card account associated with the user.

Another disclosed embodiment described herein is an EVCS or EVSE comprising: a display device; a computer processor; and one or more non-transitory computer-readable media storing computer-executable instructions which when executed by the computer processor cause the display device to display advertisements. The display device can comprise a touch screen interface. Further, the advertisements can be displayable at any one or more of multiple locations on the display device. The advertisements can be selected based at least in part on one or more of the following criteria: a location of the EVCS or EVSE, an identity of a viewer, chronological factors, meteorological conditions, make of a vehicle plugged into the EVCS or EVSE, model of the vehicle plugged into the EVCS or EVSE, year of manufacture of the vehicle plugged into the EVCS or EVSE, or installed equipment on the vehicle plugged into the EVCS or EVSE. The advertisements can comprise one or more of banner ads, box ads, still images, motion pictures, audio clips, commercials, or software computer applications configured to request and accept interaction with the viewer. The EVCS or EVSE can be further configured to receive input from a viewer in response to the advertisements, the input being received via a touch screen or keypad coupled to the EVCS or EVSE. For example, a virtual numerical, alpha, or alpha-numerical keyboard can be displayed to the viewer, the virtual numerical, alpha, or alpha-numerical keyboard being configured to allow the viewer to input data in response to one or more of the advertisements. The EVCS or EVSE can be further configured to control a charging or discharging operation for one or more vehicles coupled to the EVCS or EVSE. For instance, the EVCS or EVSE can be further configured to control a charging operation for one or more vehicles coupled to the EVCS or EVSE, wherein the charging operation is provided at no cost to a user of the electric vehicle. The EVCS or EVSE can also be configured to transmit information about an identity of a user of an electric vehicle coupled to the EVCS or EVSE, receive information indicating that the user of the electric vehicle is authorized to use the EVCS or EVSE, and allow the user of the electric vehicle to charge the electric vehicle without receiving monetary compensation from the user, causing an account associated with the user to be debited, or causing a credit card charge to be made to a credit card account associated with the user.

Another disclosed embodiment is a method comprising, using a computer processor, transmitting advertising data to an EVCS or EVSE, the EVCS or EVSE being configured to display one or more advertisements based on the advertising data. The advertising data can comprise one or more of: data indicative of the content of the advertisements, scheduling instruction sets for the advertisements, data indicating which of the advertisements to display at the EVCS or EVSE, data indicating how long to display the advertisements at the EVCS or EVSE, data indicating a location on the EVCS or EVSE where the advertisements are to be displayed, or data indicating a size of the advertisements. The method can further comprise receiving information about an identity of a user of an electric vehicle at the EVCS or EVSE; transmitting information to the EVCS or EVSE indicating that the user is authorized to use the EVCS or EVSE; and allowing the user of the electric vehicle to charge the electric vehicle at the EVCS or EVSE at no cost to the user. The method can also further comprise receiving information about an identity of a user of a electric vehicle at the EVCS or EVSE; retrieving information from a user database based on the identity of the operator, the information from the user database including information indicating one or more of the user's interests, personal preferences, consumer history, usage history, age, gender, household income level, employer, or home address; selecting targeted advertising data based at least in part on the information retrieved from the user database; and transmitting the targeted advertising data to the EVCS or EVSE, the EVCS or EVSE being configured to display one or more targeted advertisements based on the targeted advertising data.

Another embodiment disclosed herein comprises one or more non-transitory computer-readable media storing computer-executable instructions which when executed by a computer cause the computer to perform a method, the method comprising transmitting advertising data to an EVCS or EVSE, the EVCS or EVSE being configured to display one or more advertisements based on the advertising data. The advertising data can comprise one or more of: data indicative of the content of the advertisements, scheduling instruction sets for the advertisements, data indicating which of the advertisements to display at the EVCS or EVSE, data indicating how long to display the advertisements at the EVCS or EVSE, data indicating a location on the EVCS or EVSE where the advertisements are to be displayed, or data indicating a size of the advertisements. The method can further comprise receiving information about an identity of a user of an electric vehicle at the EVCS or EVSE; transmitting information to the EVCS or EVSE indicating that the user is authorized to use the EVCS or EVSE; and allowing the user of the electric vehicle to charge the electric vehicle at the EVCS or EVSE at no cost to the user. The method can also further comprise receiving information about an identity of a user of a electric vehicle at the EVCS or EVSE; retrieving information from a user database based on the identity of the operator, the information from the user database including information indicating one or more of the user's interests, consumer preferences, consumer history, usage history, age, gender, household income level, employer, or home address; selecting targeted advertising data based at least in part on the information retrieved from the user database; and transmitting the targeted advertising data to the EVCS or EVSE, the EVCS or EVSE being configured to display one or more targeted advertisements based on the targeted advertising data.

Another embodiment disclosed herein is a computer, comprising: a computer processor; and one or more non-transitory computer-readable media storing computer-executable instructions which when executed by the computer processor transmit advertising data to an EVCS or EVSE, the EVCS or EVSE being configured to display one or more advertisements based on the advertising data. The advertising data can comprise one or more of: data indicative of the content of the advertisements, scheduling instruction sets for the advertisements, data indicating which of the advertisements to display at the EVCS or EVSE, data indicating how long to display the advertisements at the EVCS or EVSE, data indicating a location on the EVCS or EVSE where the advertisements are to be displayed, or data indicating a size of the advertisements.

Another embodiment disclosed herein is a method comprising receiving data from an EVCS or EVSE in response to an advertisement being displayed at the EVCS or EVSE, the data having been input by a viewer at the EVCS or EVSE and indicating one or more of a request for a text, a request for an email coupon, a request for advertising material, a name of the viewer, an address of the viewer, a phone number of the viewer, or an email address of the viewer. The method can further comprise, responsive to the data, causing a text, email coupon, or advertising material to be sent to one or more of the viewer's address, phone number, or email address.

Another embodiment disclosed herein comprises one or more non-transitory computer-readable media storing computer-executable instructions which when executed by a computer cause the computer to perform a method, the method comprising receiving data from an EVCS or EVSE in response to an advertisement being displayed at the EVCS or EVSE, the data having been input by a viewer at the EVCS or EVSE and indicating one or more of a request for a text, a request for an email coupon, a request for advertising material, a name of the viewer, an address of the viewer, a phone number of the viewer, or an email address of the viewer. The method can further comprise, responsive to the data, causing a text, email coupon, or advertising material to be sent to one or more of the viewer's address, phone number, or email address.

Another embodiment disclosed herein is a computer, comprising: a computer processor; and one or more non-transitory computer-readable media storing computer-executable instructions which when executed by the computer processor receive data from an EVCS or EVSE in response to an advertisement being displayed at the EVCS or EVSE, the data having been input by a viewer at the EVCS or EVSE and indicating one or more of a request for a text, a request for an email coupon, a request for advertising material, a name of the viewer, an address of the viewer, a phone number of the viewer, or an email address of the viewer. The computer-executable instructions can be further configured to cause a text, email coupon, or advertising material to be sent to one or more of the viewer's address, phone number, or email address in response to the data.

Another embodiment disclosed herein is a method comprising providing a web site for advertisers using an electric vehicle charging station advertising system, the web site allowing the advertisers to control one or more advertisements displayed on one or more electric vehicle charging stations by allowing the advertisers to perform one or more of the following: upload advertising content, design advertising content, customize advertising content to the display device of the EVCS/EVSE, schedule display of advertising, specify one or more criteria used to affect a display of advertising, provide email addresses or server locations to which advertising reports are to be sent, or receive user data or other information gathered by the electric vehicle charging station advertising system related to advertising performed by the advertiser.

Another embodiment disclosed herein comprises one or more non-transitory computer-readable media storing computer-executable instructions which when executed by a computer cause the computer to perform a method, the method comprising: providing a web site for advertisers using an electric vehicle charging station advertising system, the web site allowing the advertisers to control one or more advertisements displayed on one or more electric vehicle charging stations by allowing the advertisers to perform one or more of the following: upload advertising content, design advertising content, customize advertising content to the display device of the EVCS/EVSE, schedule display of advertising, specify one or more criteria used to affect a display of advertising, provide email addresses or server locations to which advertising reports are to be sent, or receive user data or other information gathered by the electric vehicle charging station advertising system related to advertising performed by the advertiser.

Another embodiment disclosed herein is a computer, comprising: a computer processor; and one or more non-transitory computer-readable media storing computer-executable instructions which when executed by the computer processor provide a web site for advertisers using an electric vehicle charging station advertising system, the web site allowing the advertisers to control one or more advertisements displayed on one or more electric vehicle charging stations by allowing the advertisers to perform one or more of the following: upload advertising content, design advertising content, customize advertising content to the display device of the EVCS/EVSE, schedule display of advertising, specify one or more criteria used to affect a display of advertising, provide email addresses or server locations to which advertising reports are to be sent, or receive user data or other information gathered by the electric vehicle charging station advertising system related to advertising performed by the advertiser.

Furthermore, it is to be understood that any of the features and embodiments described herein can be used in combination with any of the features and embodiments described in U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; and U.S. Provisional Application No. 61/317,181, filed on Mar. 24, 2010, and entitled "ELECTRIC VEHICLE CHARGING STATION PARKING METER SYSTEM", all of which are hereby incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. I therefore claim as my invention all that comes within the scope and spirit of these claims and their equivalents.

What is claimed is:

1. A method of operating an electric vehicle charging station ("EVCS") or electric vehicle supply equipment ("EVSE"), comprising:
   displaying one or more advertisements on a display device of the EVCS or EVSE as the EVCS or EVSE awaits user interaction;
   updating an activity log file to include one or more of the following: an identity of the one or more advertisements displayed at the EVCS or EVSE; an indication of a time at which each of the one or more advertisements was displayed at the EVCS or EVSE; or an indication of the number of times each of the one or more advertisements was displayed at the EVCS or EVSE;
   receiving an indication of user interaction with the EVCS or EVSE;
   facilitating a transaction between a user and the EVCS or EVSE by which the user indicates that one or more electric vehicle batteries of an electric vehicle are to be charged via one of one or more charging ports of the EVCS or EVSE; and
   controlling a charging operation that provides an electric charge to the one or more electric vehicle batteries of the electric vehicle via the one of the one or more charging ports of the EVCS or EVSE.

2. The method of claim 1, wherein the receiving comprises receiving the indication of the user interaction via a touch screen interface associated with the display device.

3. The method of claim 1, wherein the displaying comprises displaying the one or more advertisements at one of a top, a bottom, or a central region of the display device.

4. The method of claim 1, further comprising:
   receiving user identification information from the user; and
   determining whether the user is authorized to use the EVCS or EVSE based on the user identification information.

5. The method of claim 4, wherein the determining whether the user is authorized to use the EVCS or EVSE comprises accessing user data stored locally at the EVCS or EVSE.

6. The method of claim 4, wherein the determining whether the user is authorized to use the EVCS or EVSE comprises transmitting at least a portion of the user identification information to a remote server and receiving a response from the remote server indicating whether the user is authorized to use the EVCS or EVSE.

7. The method of claim 1, further comprising:
   receiving user identification information from the user;
   selecting one or more targeted advertisements for display on the display device of the EVCS or EVSE, the one or more targeted advertisements being selected based at least in part on the user identification information; and
   displaying the one or more targeted advertisements on the display device of the EVCS or EVSE.

8. The method of claim 7, wherein the selecting the one or more targeted advertisements comprises selecting the one or more targeted advertisements from a plurality of advertisements stored locally at the EVCS or EVSE, the plurality of advertisements stored locally at the EVCS or EVSE further including demographic information indicative of a target audience for each of the plurality of advertisements.

9. The method of claim 7, wherein the selecting the one or more targeted advertisements comprises transmitting at least a portion of the user identification information to a remote server and receiving a response from the remote server indicating whether the user is authorized to use the EVCS or EVSE and demographic information about the user.

10. The method of claim 7, wherein the selecting the one or more targeted advertisements comprises selecting the one or more targeted advertisements based at least in part on one or more of the following criteria: a location of the EVCS or EVSE, an identity of the user, an age of the user, a gender of the user, demographic information about the user, chronological factors, meteorological conditions, make of a vehicle owned by the user, model of the vehicle plugged into the EVCS or EVSE, year of manufacture of the vehicle plugged into the EVCS or EVSE, or installed equipment on the vehicle plugged into the EVCS or EVSE.

11. The method of claim 1, further comprising:
   receiving user identification information from the user;
   transmitting at least a portion of the user identification information to a remote server;
   receiving an indication of one or more targeted advertisements to display to the user from the remote server.

12. The method of claim 1, wherein the one or more advertisements comprise one or more of banner ads, box type ads, still images, motion pictures, audio clips, commercials, or software computer applications configured to request and accept interaction with the user.

13. The method of claim 1, further comprising allowing the user of the electric vehicle to charge the electric vehicle without receiving monetary compensation from the user, without causing an account associated with the user to be debited, and without causing a credit card charge to be made to a credit card account associated with the user.

14. The method of claim 1, further comprising transmitting the activity log file to a remote server.

15. One or more non-transitory computer-readable media storing computer-executable instructions which when executed by a computer processor cause the computer processor to perform a method, the method comprising:
   displaying one or more advertisements on a display device of the EVCS or EVSE as the EVCS or EVSE awaits user interaction;
   updating an activity log file to include one or more of the following: an identity of the one or more advertisements displayed at the EVCS or EVSE; an indication of a time at which each of the one or more advertisements was displayed at the EVCS or EVSE; or an indication of the number of times each of the one or more advertisements was displayed at the EVCS or EVSE;
   receiving an indication of user interaction with the EVCS or EVSE;

facilitating a transaction between a user and the EVCS or EVSE by which the user indicates that one or more electric vehicle batteries of an electric vehicle are to be charged via one of one or more charging ports of the EVCS or EVSE; and controlling a charging operation that provides an electric charge to the one or more electric vehicle batteries of the electric vehicle via the one of the one or more charging ports of the EVCS or EVSE.

16. The one or more non-transitory computer-readable media of claim 15, wherein the receiving comprises receiving the indication of the user interaction via a touch screen interface associated with the display device.

17. The one or more non-transitory computer-readable media of claim 15, wherein the displaying comprises displaying the one or more advertisements at one of a top, a bottom, or a central region of the display device.

18. The one or more non-transitory computer-readable media of claim 15, wherein the method further comprises:
receiving user identification information from the user; and
determining whether the user is authorized to use the EVCS or EVSE based on the user identification information.

19. The one or more non-transitory computer-readable media of claim 18, wherein the determining whether the user is authorized to use the EVCS or EVSE comprises accessing user data stored locally at the EVCS or EVSE.

20. The one or more non-transitory computer-readable media of claim 18, wherein the determining whether the user is authorized to use the EVCS or EVSE comprises transmitting at least a portion of the user identification information to a remote server and receiving a response from the remote server indicating whether the user is authorized to use the EVCS or EVSE.

21. The one or more non-transitory computer-readable media of claim 15, wherein the method further comprises:
receiving user identification information from the user;
selecting one or more targeted advertisements for display on the display device of the EVCS or EVSE, the one or more targeted advertisements being selected based at least in part on the user identification information; and
displaying the one or more targeted advertisements on the display device of the EVCS or EVSE.

22. The one or more non-transitory computer-readable media of claim 21, wherein the selecting the one or more targeted advertisements comprises selecting the one or more targeted advertisements from a plurality of advertisements stored locally at the EVCS or EVSE, the plurality of advertisements stored locally at the EVCS or EVSE further including demographic information indicative of a target audience for each of the plurality of advertisements.

23. The one or more non-transitory computer-readable media of claim 21, wherein the selecting the one or more targeted advertisements comprises transmitting at least a portion of the user identification information to a remote server and receiving a response from the remote server indicating whether the user is authorized to use the EVCS or EVSE and demographic information about the user.

24. The one or more non-transitory computer-readable media of claim 21, wherein the selecting the one or more targeted advertisements comprises selecting the one or more targeted advertisements based at least in part on one or more of the following criteria: a location of the EVCS or EVSE, an identity of the user, an age of the user, a gender of the user, demographic information about the user, chronological factors, meteorological conditions, make of a vehicle owned by the user, model of the vehicle plugged into the EVCS or EVSE, year of manufacture of the vehicle plugged into the EVCS or EVSE, or installed equipment on the vehicle plugged into the EVCS or EVSE.

25. The one or more non-transitory computer-readable media of claim 15, wherein the method further comprises:
receiving user identification information from the user;
transmitting at least a portion of the user identification information to a remote server;
receiving an indication of one or more targeted advertisements to display to the user from the remote server.

26. The one or more non-transitory computer-readable media of claim 15, wherein the one or more advertisements comprise one or more of banner ads, box type ads, still images, motion pictures, audio clips, commercials, or software computer applications configured to request and accept interaction with the user.

27. The one or more non-transitory computer-readable media of claim 15, wherein the method further comprises allowing the user of the electric vehicle to charge the electric vehicle without receiving monetary compensation from the user, without causing an account associated with the user to be debited, and without causing a credit card charge to be made to a credit card account associated with the user.

28. The one or more non-transitory computer-readable media of claim 15, wherein the method further comprises transmitting the activity log file to a remote server.

29. An electric vehicle charging station ("EVCS") or electric vehicle supply equipment ("EVSE") comprising:
a charging port configured to be coupled to an electric vehicle and charge one or more batteries of the electric vehicle;
a display device;
a computer processor; and
one or more non-transitory computer-readable media storing computer-executable instructions which when executed by the computer processor cause the display device to display one or more advertisements and cause the storage of an activity log file, the activity log file storing data indicating one or more of: an identity of which advertisements have been displayed at the EVCS or EVSE, an indication of times at which the advertisements were displayed at the EVCS or EVSE, or an indication of the number of times each of the advertisements has been displayed at the EVCS or EVSE.

30. The EVCS or EVSE of claim 29, wherein the display device comprises a touch screen interface.

31. The EVCS or EVSE of claim 29, wherein the advertisements are displayable at any one or more of multiple locations on the display device.

32. The EVCS or EVSE of claim 29, wherein the computer-executable instructions, when executed by the computer processor, select the advertisements based at least in part on one or more of the following criteria: a location of the EVCS or EVSE, an identity of the user, an age of the user, a gender of the user, demographic information about the user, chronological factors, meteorological conditions, make of a vehicle owned by the user, model of the vehicle plugged into the EVCS or EVSE, year of manufacture of the vehicle plugged into the EVCS or EVSE, or installed equipment on the vehicle plugged into the EVCS or EVSE.

33. The EVCS or EVSE of claim 29, wherein the advertisements comprise one or more of banner ads, box ads, still images, motion pictures, audio clips, commercials, or software computer applications configured to request and accept interaction with the viewer.

34. The EVCS or EVSE of claim 29, wherein the computer-executable instructions, when executed by the computer processor, select the advertisements to display from a plurality of advertisements stored locally at the EVCS or EVSE.

35. The EVCS or EVSE of claim 29, wherein the computer-executable instructions, when executed by the computer processor, input advertising data, including data about the content of the advertisements to display, transmitted from a remote server.

36. The EVCS or EVSE of claim 29, wherein the computer-executable instructions, when executed by the computer processor, control a charging or discharging operation for one or more electric vehicles coupled to the EVCS or EVSE.

37. The EVCS or EVSE of claim 36, wherein the charging operation is provided without receiving monetary compensation, without causing an account associated with the electric vehicle to be debited, and without causing a credit card charge to be made to a credit card account.

38. The EVCS or EVSE of claim 29, wherein the one or more non-transitory computer-readable media further store advertising data associated with the advertisements, the advertising data comprising data indicative of the content of the one or more advertisements.

39. The EVCS or EVSE of claim 38, wherein the advertising data further comprises one or more of data indicative of a schedule for displaying the one or more advertisements, data indicative of a display duration for at least one of the advertisements, or data indicative of a size of at least one of the advertisements.

40. The EVCS or EVSE of claim 38, wherein the advertising data further comprises demographic data for at least one of the advertisements, the demographic data comprising demographic information about a targeted viewer for the at least one of the advertisements.

41. The EVCS or EVSE of claim 40, wherein the demographic data includes one or more of an age range of the targeted viewer, a gender of the targeted viewer, a household income range of the targeted viewer, interests or personal preferences of the targeted viewer, or a home location of the targeted viewer.

* * * * *